(12) United States Patent
Takamizawa et al.

(10) Patent No.: US 6,712,518 B2
(45) Date of Patent: Mar. 30, 2004

(54) PRELOADING METHOD FOR PRELOAD-ADJUSTABLE ROLLING BEARING AND MANUFACTURE OF THE SAME

(75) Inventors: Toru Takamizawa, Kanagawa (JP); Daijiro Kitahara, Tokyo (JP); Seizo Miyazaki, Kanagawa-ken (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/080,152

(22) Filed: Feb. 22, 2002

(65) Prior Publication Data

US 2002/0118901 A1 Aug. 29, 2002

Related U.S. Application Data

(60) Division of application No. 08/620,541, filed on Mar. 25, 1996, now Pat. No. 6,394,657, which is a continuation of application No. 08/254,589, filed on Jun. 6, 1994, now Pat. No. 5,509,198, which is a continuation-in-part of application No. 08/020,533, filed on Feb. 22, 1993, now Pat. No. 5,341,569.

(30) Foreign Application Priority Data

Feb. 24, 1992 (JP) .............................. 4-72181
Dec. 2, 1992 (JP) ............................. 4-345146
Jun. 8, 1993 (JP) ......................... H5-163293

(51) Int. Cl.$^7$ .............................................. F16C 19/08
(52) U.S. Cl. ....................................... 384/450; 384/517
(58) Field of Search ............................... 384/556, 517, 384/563, 512, 537, 450

(56) References Cited

U.S. PATENT DOCUMENTS

| | | | |
|---|---|---|---|
| 3,167,364 A | | 1/1965 | Dunn |
| 3,581,362 A | * | 6/1971 | Turner .................. 29/898.09 |
| 3,651,550 A | * | 3/1972 | Bennett .................. 29/898.09 |
| 4,476,614 A | * | 10/1984 | Pittroff .................. 29/898.09 |
| 4,657,412 A | | 4/1987 | McLarty et al. |
| 4,713,704 A | * | 12/1987 | Voll et al. |
| 1,900,958 A | | 2/1990 | Kitaham et al. |
| 4,900,958 A | * | 2/1990 | Kitahara et al. ............ 384/512 |
| 5,045,738 A | | 9/1991 | Hishida et al. |
| 6,394,657 B1 | * | 5/2002 | Takamizawa et al. ....... 384/512 |

FOREIGN PATENT DOCUMENTS

| | | |
|---|---|---|
| DE | 36 06 042 | 9/1986 |
| GB | 748198 | 4/1956 |
| JP | 57-97914 | 6/1982 |
| JP | 57-140912 | 8/1982 |
| JP | 60-184426 | 12/1985 |
| JP | 60-196024 | 12/1985 |
| JP | 61-145761 | 7/1986 |

(List continued on next page.)

OTHER PUBLICATIONS

Partial English translations of Japanese patent publications 62–170363, 1–82903, 3–222661, 62–22323, 60–184426, 57–97914, 1–229114, and1–266320. (No dates).

*Primary Examiner*—Lenard A. Footland
(74) *Attorney, Agent, or Firm*—Crowell & Moring LLP

(57) ABSTRACT

An assembly method of a preload-adjustable rolling bearing unit comprising the steps of providing a shaft having a first inner raceway, an inner ring being press fitted onto the shaft and having a second inner raceway, such that a pitch of both raceways is set greater than a pitch required to give a predetermined preload, providing an outer ring having outer raceways, providing a plurality of balls to be fitted between the outer raceways of the outer ring, and the first and second inner raceways, positioning the balls equidistant apart in the circumferential direction, and vibrating the rolling bearing unit by means of piezo electric elements while moving the inner ring in the axial direction, measuring the resonant frequency of the rolling bearing unit with a vibration sensor to control the preload whereby the inner ring is pressed onto a shaft while vibrating with only a small amount of energy without scratching the raceway and rolling surfaces.

2 Claims, 23 Drawing Sheets

FOREIGN PATENT DOCUMENTS

| | | |
|---|---|---|
| JP | 62-22323 | 2/1987 |
| JP | 62-170363 | 10/1987 |
| JP | 1-82903 | 6/1989 |
| JP | 1-229114 | 9/1989 |
| JP | 1-266320 | 10/1989 |
| JP | 2-76647 | 3/1990 |
| JP | 2-159536 | 6/1990 |
| JP | 3-222661 | 10/1991 |

* cited by examiner

PRELOADING METHOD FOR PRELOAD-ADJUSTABLE ROLLING BEARING AND MANUFACTURE OF THE SAME

CROSS-REFERENCE TO RELATED APPLICATION

This application is a divisional of application Ser. No. 08/620,541, filed Mar. 25, 1996, now U.S. Pat. No. 6,394,657 which is a continuation of Ser. No. 08/254,589, filed Jun. 6, 1994, now U.S. Pat. No. 5,509,198, which, in turn, is a continuation-in-part of Ser. No. 08/020,533, filed February 22, 1993, now U.S. Pat. No. 5,341,569.

FIELD OF THE INVENTION

The present invention relates to a method for preloading preload-adjustable rolling bearings adapted to be assembled in various precision rotary components, for example, spindle motors, rotary actuators, rotary encoders and the like for video tape recorders (VTR), hard disk drives (HDD) and laser beam printers (LBP) in order to rotatably support their rotating elements. This invention is also concerned with a method for manufacturing such preload-adjustable rolling bearings.

DESCRIPTION OF THE RELATED ART

A ball bearing is used to rotatably support a spindle of VTR or HDD while preventing whirling (i.e., motions in a direction perpendicular to the spindle) and/or axial deviations. A pair of mutually independent ball bearings (of either the deep groove type or the angular type) have heretofore been employed. With a view toward making efficient the assembly of ball bearings in a rotatably supporting part, use of a double-row ball bearing has also been proposed.

A double-row ball bearing is constructed by concentrically combining a spindle 2, which has a pair of deep inner race grooves in an outer peripheral wall thereof as shown in FIG. 12(A), with an outer race 4, which has a pair of deep outer race grooves 3,3 in an inner peripheral wall thereof as depicted in FIG. 12(B), and then rotatably inserting plural balls 5,5 between the inner race grooves 1,1 and the corresponding outer race grooves 3,3 as illustrated in FIG. 12(C). FIG. 12(C) also shows retainers 6,6 for holding the balls 5,5 at equal angular intervals and seals 7,7 for preventing dust and the like from penetrating into the ball-inserted parts.

Although the construction of such a double-row ball bearing as shown in FIG. 12(C) has been known, it has heretofore been difficult to manufacture a double-row ball bearing suitable for use in supporting a spindle in VTR or HDD. This can be attributed to the reasons to be described next.

A ball bearing for use in supporting a spindle in VTR or HDD is required to have extremely high accuracy in order to avoid whirling motions and axial displacements. Therefore, a ball bearing for use in supporting such a spindle is used in a state preloaded in an axial direction.

Upon insertion of the balls 5 between each inner race groove 1 and its corresponding outer race groove 3 to assemble the deep-groove ball bearing, on the other hand, the inner race groove 1 and the outer race groove 3 are brought into an eccentric relationship to widen a radial spacing 8, which extends in a circumferential direction between both the grooves 1 and 3, at a part thereof as illustrated in FIG. 13. From the widened part of the spacing 8, the balls 5,5 are inserted between the inner race groove 1 and the outer race groove 3 as many as desired. Thereafter, the inner race groove 1 and the outer race groove 3 are rendered concentric with each other and the desired number of the balls 5,5 are disposed at equal angular intervals.

To rearrange the plural balls 5,5, which have been inserted together in the widened part of the spacing 8, at equal angular intervals as described above, it is necessary to make the individual balls 5,5 slide on and relative to the inner race groove 1 and the outer race groove 3. If the individual balls 5,5 are strongly pressed by the inner race groove 1 and the outer race groove 3, in other words, are in a preloaded state at this time, rolling surfaces of the inner race groove 1, outer race groove 3 and balls 5,5 are prone to damage. Their damage leads to such a problem such that vibrations may occur during rotation or the durability may be impaired.

In the case of the construction that a pair of single-row deep ball bearings are arranged at an interval as disclosed, for example, in Japanese Patent Application Laid-Open (Kokai) No. SHO 57-200722, on the other hand, each ball bearing is assembled in a state not applied with a preload so that this construction is free of such inconvenience as referred to above. However, the assembly work of the ball bearings is cumbersome.

Further, double-row, deep-groove ball bearings useful in tension pulleys or water pumps are disclosed, for example, in Japanese Patent Application Laid-Open (Kokai) Nos. SHO 61-65913 and SHO 61-79899 and Japanese Utility Model Application Laid-Open (Kokai) Nos. SHO 50-101753 and SHO 56-127456. These bearings are however not require to have very high rotational accuracy and are used in a state not applied with preload. They cannot therefore be used to support spindles in VTR, HDD or the like.

Japanese Patent Application Laid-Open (Kokai) No. SHO 61-145761 discloses a double-row angular ball bearing while Japanese Utility Model Application Laid-Open (Kokai) No. SHO 62-22323 discloses a double-row ball bearing constructed in combination of a deep-groove ball bearing and an angular ball bearing. To assemble an angular ball bearing, it is necessary to heat an outer race as disclosed, for example, in Japanese Utility Model Publication (Kokoku) No. SHO 39-3916 so that the outer race is caused to expand to protect shoulder portions of each groove and/or rolling surfaces of balls when the balls pass along the shoulder portions. The assembly work is therefore irksome.

Japanese Patent Publication (Kokoku) No. SHO 57-140912 discloses the invention in which after a double-row, deep-groove ball bearing equipped with an outer race formed in combination of a main outer race and a subordinate outer race axially displaceable relative to the main outer race has been assembled in a state not applied with preload, the subordinate outer race is caused to displace axially to apply a predetermined preload and is then fixed by a presser member. It also discloses the invention in which a predetermined preload is applied by axially pressing the subordinate outer race with a spring. The inventions disclosed in this patent publication, however, requires such a presser member or spring. This results in more cumbersome management or control of parts and also in more irksome assembly work. Moreover, the ball bearing may require an unduly large axial length.

U.S. Pat. No. 4,900,958 discloses such constructions as shown in FIGS. 14 and 15, respectively. In the case of the construction depicted in FIG. 14, ball bearings 9,9 of the deep groove type (or of the angular type) are disposed in a pair between an outer peripheral wall of a spindle 2 and an inner peripheral wall of a housing 10, and inner races 11,11 of both the ball bearings 9,9 are pushed in a direction approaching toward each other to apply a preload to balls 5,5 of both the ball bearings 9,9.

Described specifically, an end face of one of the inner races, i.e., of the inner race 11 located on the right-hand side as viewed in FIG. 14 is brought into abutment against a stop ring 12 and the other inner race, i.e., the inner race 11 on the left-hand side as viewed in FIG. 14 is pushed toward the stop ring 12, whereby a preload is applied. The left-hand inner race 11 is fixed on the spindle 2 by an adhesive fitting. It is therefore necessary to continuously push the left-hand inner race 11 toward the stop ring 12 under a load equivalent to the preload until the adhesive solidifies or the left-hand inner race so heated shrinks.

In the case of the construction illustrated in FIG. 15, on the other hand, inner race grooves 1,1 are formed in double rows in an outer peripheral wall of a spindle 2. A spacer 13 is arranged between outer rings 4,4 which are internally fitted in a pair in a housing 10. By the spacer 13, both the outer races 4,4 are pushed in a direction moving away from each other so that a preload is applied to balls 5,5.

Further, Japanese Utility Model Application Laid-Open (Kokai) No. HEI 3-36517 discloses such a construction as shown in FIG. 16. By a leaf spring 14 held between outer races 4,4 arranged in a pair, the outer races 4,4 are both pushed in a direction moving away from each other so that a preload is applied to balls 5,5.

Japanese Patent Application Laid-Open (Kokai) No. HEI 3-222661 and U.S. Pat. No. 5,045,738 disclose such constructions as illustrated in FIGS. 17 and 18, respectively. In the construction of FIG. 17, a preload is applied by pushing with a leaf spring 14 an outer race 4 internally fitted in a housing. In the construction of FIG. 18, on the other hand, an outer race 4 is fixed on the housing 10 by an adhesive or shrinkage fitting while applying a predetermined preload. Of double-row outer race grooves 3,3, one of the outer race groove 3,3 is formed in an inner peripheral wall of the outer race 4 while the other outer race groove 3 is formed in an inner peripheral wall of the housing.

Although illustration by drawings is omitted, Japanese Patent Application Laid-Open (Kokai) No. SHO 61-145761 and U.S. Pat. No. 4,713,704 discloses such a construction that one of double-row inner race grooves is formed in an outer peripheral wall of a spindle, the other inner race groove is formed in an outer peripheral wall of an inner race externally fitted on the spindle, and the inner race is adhered and fixed to the spindle with balls being applied with an appropriate preload.

The above-described constructions of FIGS. 14 to 18 and that disclosed in Japanese Patent Application Laid-Open (Kokai) No. SHO 61-145761 are accompanied not only by the problems that they require cumbersome assembly work and parts management or control as described above but also by the problem that they tend to develop small vibrations. In each of the above-described conventional constructions, each inner race 11 or outer race 4 tends to tilt upon preloading although the extent of the tilting may not be very large, because the inner race 11 is loosely fitted on the spindle 2 (in the case of the construction shown in FIG. 14) or the outer race 4 is loosely fitted in the housing (in the case of the constructions illustrated in FIGS. 15 to 18, respectively). When tilted, the bearing so assembled produces small vibrations during rotation, leading the potential problem that the performance of HDD or the like with the bearing assembled therein may be reduced.

Further, the work to fix the inner race 11 on the spindle 2 or the outer race 4 on the housing 10 by an adhesive or shrinkage fitting is conducted in a factory where the rolling bearing is manufactured. As a corollary to this, the assembler (user) who purchases the bearing and assembles it in HDD or the like cannot change-the preload of the bearing. It is therefore the current circumstance that the bearing is used as purchased without adjustment of its preload even when the assembler wishes to adjust the preload in view of a difference in specification.

To allow HDD or the like to exhibit its best performance, it is preferred to adjust the preload of the bearing in accordance with the manner of its use.

Japanese Patent Application Laid-Open (Kokai) No. HEI 1-266320 discloses a construction which permits adjustment of the preload. Namely, outer races of a rolling bearing are pushed by a piezoelectric actuator in a direction moving away from each other so that a preload is applied to the rolling bearing. The preload is adjustable by controlling a voltage impressed to the piezoelectric actuator. The construction disclosed in this patent publication, however, cannot avoid an overall dimensional increase of the rolling bearing. The rolling bearing so manufactured may be assembled in a large apparatus such as a machine tool, but its assembly in a small apparatus like HDD is difficult.

SUMMARY OF THE INVENTION

An object of the present invention is to improve the performance of various apparatuses, which have a rotatably supporting portion, by improving the accuracy of a preloaded rolling bearing without the need for particularly cumbersome assembly work or parts management or control.

A specific object of the present invention is to provide a preloading method for a preload-adjustable rolling bearing, which method can overcome the problems or inconvenience referred to above Another specific object of the present invention is to provide a manufacturing method of such a preload-adjustable rolling bearing, which method can also overcome the problems or inconvenience described above.

In one aspect of the present invention, there is thus provided a method for preloading a first preload-adjustable bearing constructed of a first rotary unit and second rotary unit rotatable relative to each other, said first rotary unit having a first race and second race arranged immobile in a direction approaching toward each other, said second rotary unit having a third race and fourth race, said third race being located opposite said first race of said first rotary unit with a first row of balls interposed therebetween, said fourth race being located opposite said second race of said first rotary unit with a second row of balls interposed therebetween, said third race being immobile relative to said second rotary unit in a direction away from said fourth race, said fourth race being fitted with said second rotary unit with an interference formed therebetween movably relative to said second rotary unit, and said fourth race being movable toward said third race under axial pressure applied between said fourth race and said second rotary unit, which method comprises:

applying axial pressure between said fourth race and said second rotary unit; and moving said third race toward said fourth race while measuring by preload measuring means a preload between said first, second, third and fourth races and said first and second rows of balls;

whereby said preload is set at a predetermined value.

In another aspect of the present invention, there is also provided a method for preloading a second preload-adjustable bearing constructed of a first rotary unit and second rotary unit rotatable relative to each other, said first rotary unit having a first race and second race arranged immobile in-a direction approaching toward each other, said second rotary unit having a third race and fourth race, said third race being located opposite said first race of said first rotary unit with a first row of balls interposed therebetween, said fourth race being located opposite said second race of said first rotary unit with a second row of balls interposed therebetween, said third race and fourth race being fitted with said second rotary unit with an interference formed therebetween movably relative to said second rotary unit, and said third race and said fourth race being movable toward each other under axial pressure applied between said third race and said fourth race, which method comprises:

applying axial pressure between said third race and said fourth race; and moving said third and force races toward each other while measuring by preload measuring means a preload between said first, second, third and fourth races and said first and second rows of balls;

whereby said preload is set at a predetermined value.

In a further aspect of the present invention, there is also provided a method for manufacturing the first preload-adjustable bearing, which method comprises:

forming at least one race groove in said fourth groove subsequent to the fitting of said fourth race with said second rotary unit.

In a still further aspect of the present invention, there is also provided a method for manufacturing the second preload-adjustable bearing, which method comprises:

forming at least one race groove in each of said third and fourth races subsequent to the fitting of said third and fourth races with said second rotary unit.

The above-described preloading methods and manufacturing methods according to the present invention permit the assembly of a rolling bearing without damaging ball rolling surfaces, the double-row inner race grooves and the double-row outer race grooves of each ball. The assembly work of the rolling bearing is therefore simple and easy. The pre loaded rolling bearing can be manufactured at low cost with small dimensions while making it possible to achieve high-accuracy support for rotation. Owing to the avoidance of damage during its manufacture, the rolling bearing so manufactured can exhibit high performance, durability and reliability.

Since the second rotary unit and the fourth race are fitted together with an interference formed therebetween movably relative to the second rotary unit, the fourth race is not caused to tilt upon preloading and moreover, is displaceable upon application of an axial force greater than holding force exerted by the interference fitting. This makes it possible to subsequently adjust a preload which has already been applied to the bearing, whereby the preload can be adjusted to an optimal value in accordance with the apparatus in which the bearing is assembled.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION AND PREFERRED EMBODIMENTS

Figure 1A:
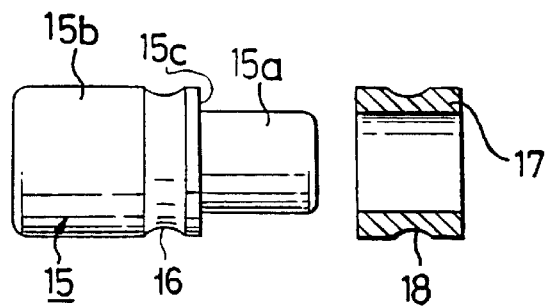
FIGS. 1(A) through 1(D) are cross-sectional views showing a first embodiment of the present invention in the order of manufacturing steps.

The first embodiment of the present invention will now be described with reference to FIGS. 1(A) through 1(D). In a spindle 15, a small-diameter portion 15a and a large-diameter portion 15b are connected at a stepped portion 15c as shown in FIG. 1(A). In an outer peripheral wall of the large-diameter portion 15b, said outer peripheral wall serving as a first peripheral wall, a deep inner race groove 16 is formed as a main race groove. An inner race 17 has an inner diameter which is slightly smaller than an outer diameter of the small-diameter portion 15a in a free state. This inner race 17 defines a subordinate inner race groove 18 of the deep groove type in an outer peripheral wall thereof.

Figure 1B:
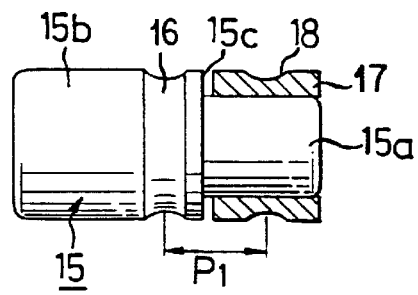

Upon manufacture of a rolling bearing having the spindle 15 and the inner race 17, the inner race 17 is, as a first step, externally fitted on the small-diameter portion 15a of the spindle 15 with sufficient strength of fitting (i.e., with strength sufficient to prevent any displacement of the inner race 17 relative to the small-diameter portion 15a even under a reaction force produced upon application of a preload) as illustrated in FIG. 1(B). A pitch Pi between the main inner race group 16 in the outer peripheral wall of the large-diameter portion 15b and the subordinate inner race groove 18 in the outer peripheral wall of the inner race 17 is set longer than a pitch $p_1$ required to apply a predetermined preload to the rolling bearing after its completion (i.e., $P_1 > p_1$).

As a second step, the spindle 15 and the inner race 17 assembled together in the first step is next inserted inside a cylindrical outer race 19. A pair of deep outer race grooves 43,43 have been formed in an inner peripheral wall of the outer race 19. The paired outer race grooves 43,43 are positioned opposite the main and subordinate, inner race grooves 16,18, respectively.

Figure 13:
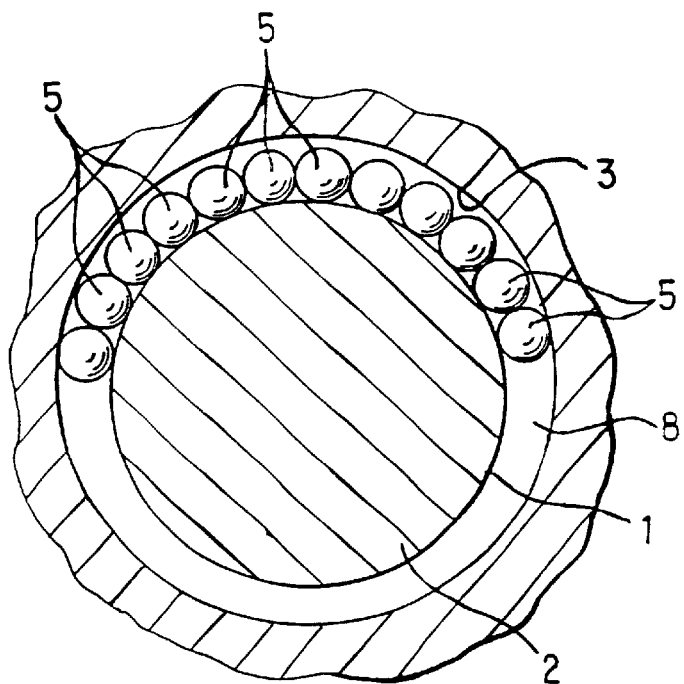
FIG. 13 is a fragmentary cross-sectional view of a ball bearing in which an outer ring groove and its corresponding inner race groove are made eccentric to permit insertion of balls.
Figure 14:
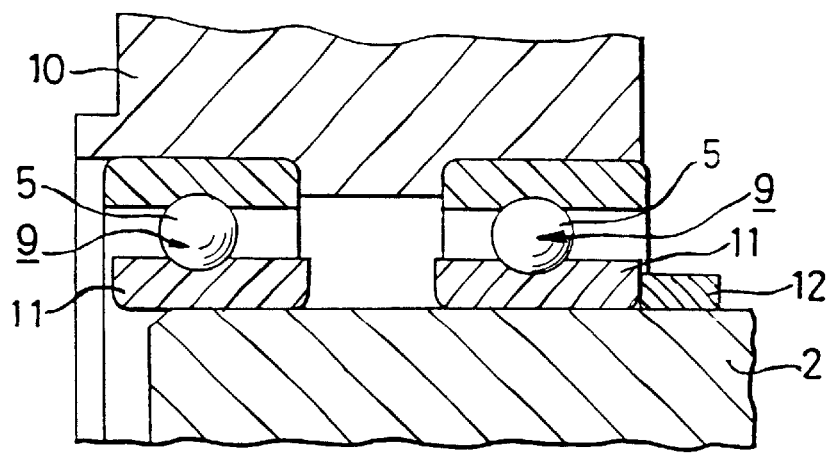
FIG. 14 is a fragmentary (half) cross-sectional view of a first example of conventional structures.
Figure 15:
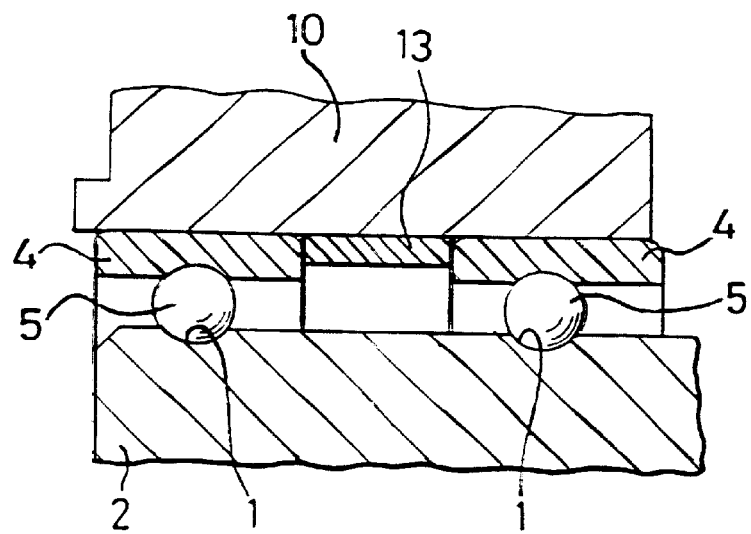
FIG. 15 is a fragmentary (half) cross-sectional view of a second example of the conventional structures.
Figure 16:
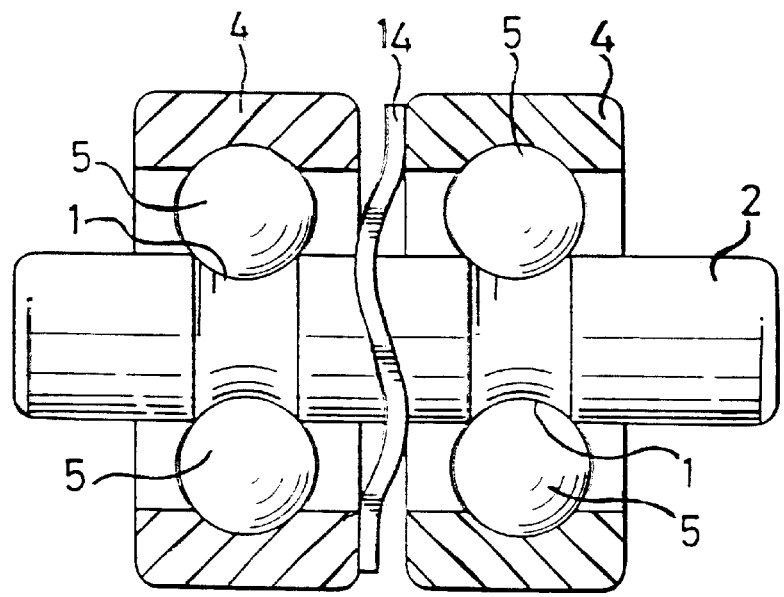
FIG. 16 is a fragmentary (half) cross-sectional view of a third example of the conventional structures.
Figure 17:
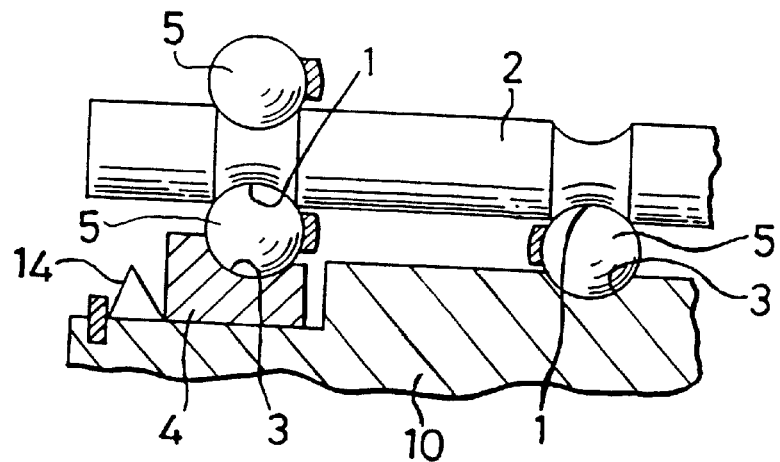
FIG. 17 is a fragmentary (half) cross-sectional view of a fourth example of the conventional structures.
Figure 18:
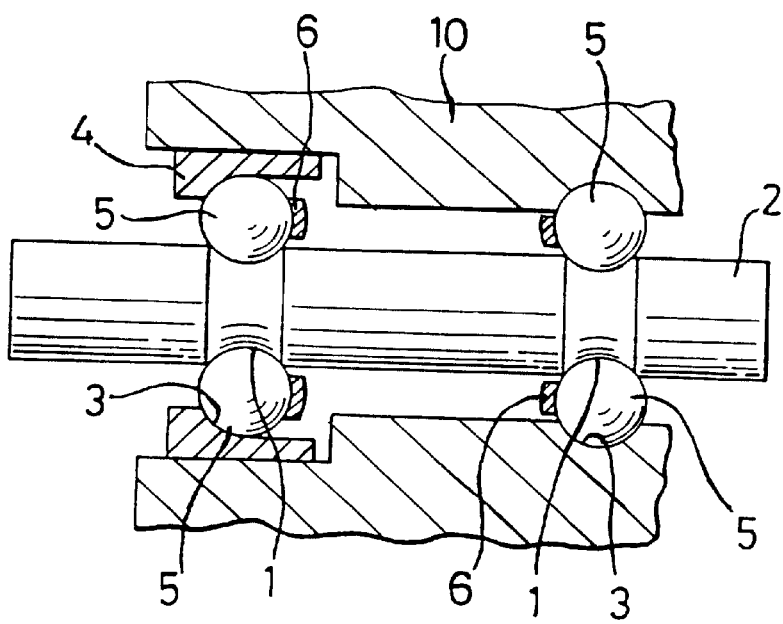
FIG. 18 is a fragmentary (half) cross-sectional view of a fifth example of the conventional structures.

As a third step, the spindle 15 and the inner and outer races 17,19 are next made eccentric with each other so that, as illustrated in FIG. 13 described above, radial spacings 8 extending in a circumferential direction between the paired outer race grooves 43,43 and the main and subordinate, inner race grooves 16,18 are widened at certain parts. Through the parts of the spacings so widened, balls 5,5 are inserted into the respective spacings as many as desired.

Figure 1C:
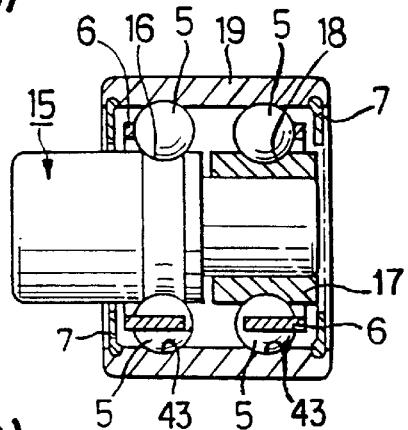
Figure 1D:
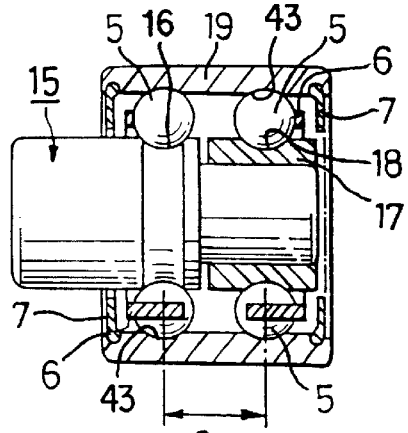

As a fourth step, the spindle 15 and the inner and outer races 17,19 are then brought into a concentric relationship while moving, in a circumferential direction, the desired numbers of balls 5,5 inserted in the respective spacings between the paired outer race grooves 43,43 and the main and subordinate, inner race grooves 16,18, whereby the individual balls are arranged at equal angular intervals. In addition, the retainers 6,6 are disposed on the respective rows of balls as illustrated in FIG. 1(C) so that the individual balls 5,5 are held at equal angular intervals. The seals 7,7 can also be arranged, as needed, on the inner peripheral wall of the outer race 19 at opposite end portions thereof. At this point, no preload has yet been applied to the individual balls 5,5.

As a fifth step, the inner race 17 is finally displaced axially on the outer peripheral wall of the spindle 15 toward the stepped portion 15c, whereby the pitch between the main inner race groove 16 and the subordinate inner race groove 18 is shortened to the pitch P1 which is required to apply the predetermined preload. At this point, the plural balls 5,5 have been applied with the predetermined preload so that the bearing is completed as a preloaded rolling bearing. Even at the time of completion of the assembly, there is a spacing between the stepped portion 15c and a proximal end face of the inner race 17.

In the preloaded rolling bearing obtained as described above, a holding force greater than an axial load corresponding to the preload occurs based on a frictional force of the interference fitting between the inner peripheral wall of the inner race 17 and the outer peripheral wall of the small-diameter portion 15a. Without the need for coating an adhesive between the spindle 15 and the inner race 17, the inner race 17 is not dislocated and the preload so applied is not lost. The assembly so completed can therefore be handled as an integral ball bearing. This can hence facilitate the work which is required to construct a bearing portion for a spindle in VTR or HDD. Owing to the preload applied in the axial direction, the rotatable support of the spindle can be achieved with high accuracy.

The inner race 17 can however be displaced relative to the small-diameter portion 15a by axially applying a force greater than the holding force produced by the interference fitting. It is therefore possible to subsequently adjust, namely, either increase or decrease the preload applied to the rolling bearing provided that a suitable force greater than the load mentioned above is applied to the inner race 17 to have the inner race 17 displaced in an axial direction.

Figure 2A:
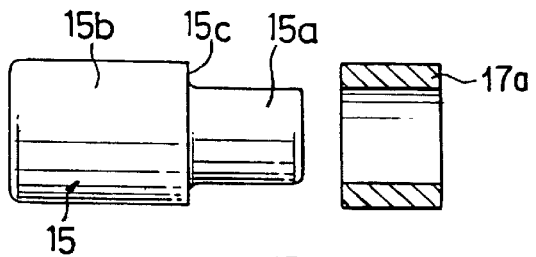
FIGS. 2(A) through 2(E) are cross-sectional views illustrating a second embodiment of the present invention in the order of manufacturing steps.
Figure 2B:
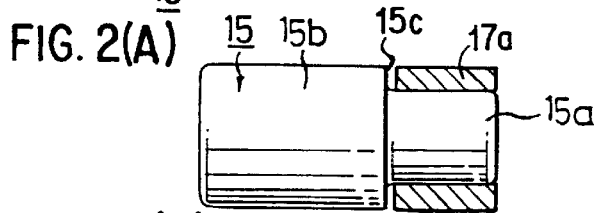
Figure 2C:
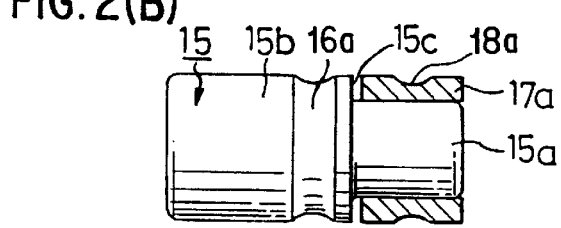
Figure 2D:
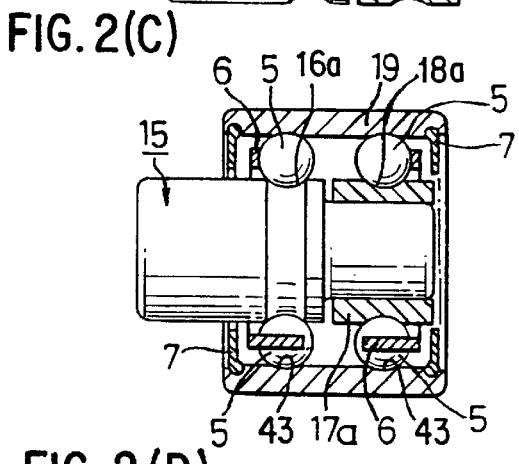

Next, FIGS. 2(A) through 2(E) illustrate the second embodiment. As opposed to the above-described first embodiment in which, in the first step, the inner race 17 with the subordinate inner race groove 18 formed beforehand in the outer peripheral wall thereof was externally fitted on the spindle 15 having the inner race groove 16 formed beforehand in the outer peripheral wall thereof, main and subordinate, outer race grooves 16a,18a are respectively formed in the outer peripheral walls of the spindle 15 and the inner race 17a subsequent to external fitting of an inner race 17a on the small-diameter portion 15a as depicted in FIGS. 2(A) through 2(C) in this embodiment.

By adopting such a construction, the external fitting of the inner race 17a on the small-diameter portion 15a can prevent the inner race groove 18 [see FIGS. 1(A) through 1(D)] from being deformed or distorted into a non-circular shape. In other words, this embodiment features the formation of the subordinate inner race groove 18a after the spindle 15 and the inner race 17a have been assembled together. This makes it possible to improve the roundness of the inner race groove 18a to a level of very high accuracy and, moreover, to minimize the eccentricity between the inner race groove 18a and the spindle 15.

The remaining construction and operation are as in the first embodiment described above, so that like elements of structure are identified by like reference numerals and their description is omitted herein to avoid unnecessary repetition.

Figure 3A:
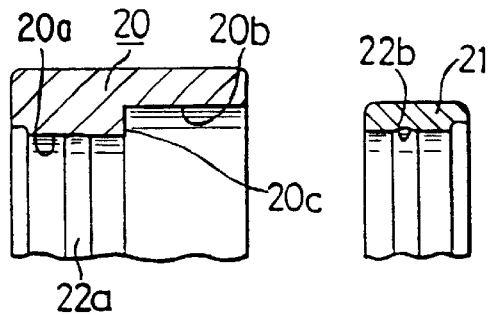
FIGS. 3(A) through 3(E) are fragmentary (half) cross-sectional views showing a third embodiment of the present invention in the order of manufacturing steps.

Reference is next made to FIGS. 3(A) through 3(E) which illustrates the third embodiment of the present invention. As is depicted in FIG. 3(A), formed in an inner peripheral wall of a main outer race 20 are a small diameter portion 20a, a large diameter portion 20b, and a stepped portion 20c connecting the portions 20a and 20b together. A subordinate outer race 21 is internally fittable in the large-diameter portion 20b. In an inner peripheral wall of the subordinate outer race 21 and an inner peripheral wall of the small-diameter portion 20a, grooves 22a,22b having an arcuate cross-section are formed over the entire circumferences thereof, respectively. Further, the subordinate outer race 21 has an outer diameter which is somewhat greater in a free state than the inner diameter of the large-diameter portion 20b.

Figure 3B:
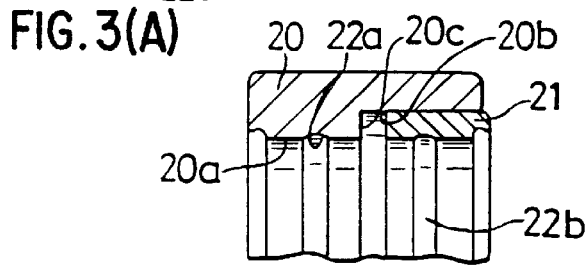
Figure 3C:
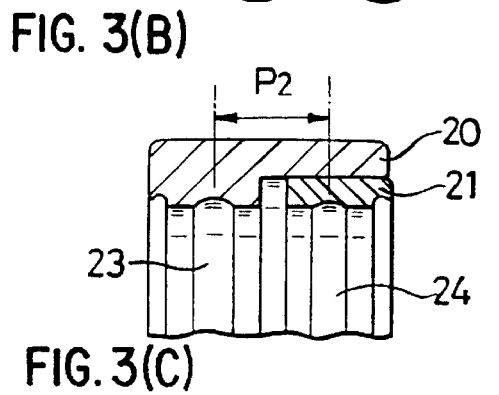

To manufacture a preloaded rolling bearing by using the main outer race 20 and the auxiliary outer race 21, as a first step, the subordinate outer race 21 is first fitted internally in the large-diameter portion 20b with sufficient strength of fitting as illustrated in FIG. 3(B), and a main outer race groove 23 as a main groove and a subordinate outer race groove 24 as a subordinate groove are formed in the grooves 22a,22b, respectively, as shown in FIG. 3(C).

As has been described above, the main and subordinate, outer race grooves 23,24 are formed after the main outer race 20 and the subordinate outer race 21 have been assembled. The roundness of these outer race grooves 23,24 can therefore be improved to a high level of accuracy and, moreover, the eccentricity between the outer race grooves 23,24 and the outer peripheral wall of the main outer race 20 can be minimized. Incidentally, the pitch P2 between the main outer race groove 23 and the subordinate outer race groove 24 formed as described above should be set longer than a pitch $p_2$ [see FIG. 3(E)] which is required to apply a predetermined preload ($P_2 > p_2$).

As a second step, a spindle with inner race grooves 1,1 formed in a pair in an outer peripheral wall [see FIG. 3(D) to be described subsequently] is next inserted inside the main outer race 20 and the subordinate outer race 21 assembled together in the first step, whereby the paired inner race grooves 1,1 are positioned opposite the main and subordinate, outer race grooves 23,24, respectively.

As a third step, as illustrated in FIG. 13, the spindle 2 and the main outer race 20 and subordinate outer race 21 are then made eccentric relative to each other and balls 5,5 are inserted, as many as needed, in spacings between the paired inner race grooves 1,1 and the main and subordinate, outer race grooves 23,24, respectively.

Figure 3D:
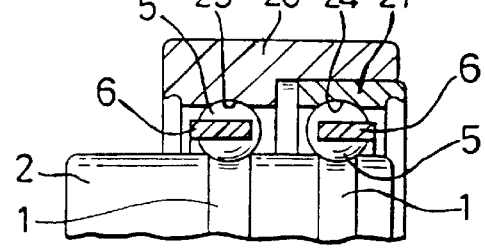

As a fourth step, as shown in FIG. 3(D), the spindle 2 and the outer main race 20 and subordinate outer race 21 are next made concentric relative to each other, and the balls 5,5 inserted as many as needed between the paired inner race grooves 1,1 and the main and subordinate, outer race grooves 23,24 are arranged at equal angular intervals. In this fourth step, retainers 6,6 are attached to the balls 5,5 arranged at equal intervals.

Figure 3E:
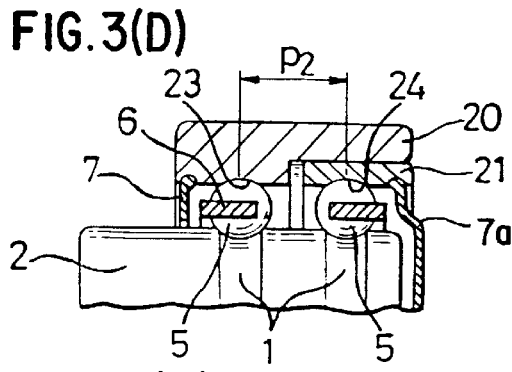

As a fifth step, the subordinate outer race 21 is finally displaced in an axial direction, that is, in a leftward direction as viewed in FIG. 3(D), along the inner peripheral wall of the main outer race 20 so that, as is depicted in FIG. 3(E), the pitch between the main outer race groove 23 and the subordinate outer race groove 24 is shortened to the pitch $p_2$ required to apply a predetermined preload. At this point, the predetermined preload is applied to the plural balls 5,5. Seals 7,7a are then attached so that a rolling bearing is completed.

Figure 4A:
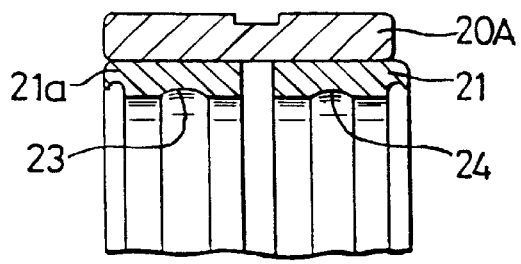
FIGS. 4(A) and 4(B) are fragmentary (half) cross-sectional views showing a fourth embodiment of the present-invention in the order of manufacturing steps.
Figure 4B:
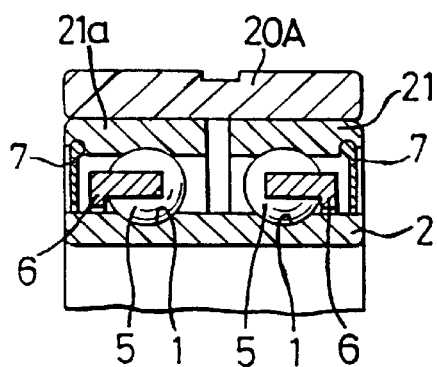
Figure 5A:
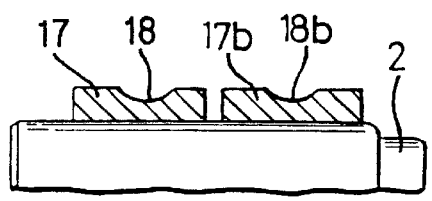
FIGS. 5(A) and 5(B) are fragmentary (half) cross-sectional views showing a fifth embodiment of the present invention in the order of manufacturing steps.
Figure 5B:
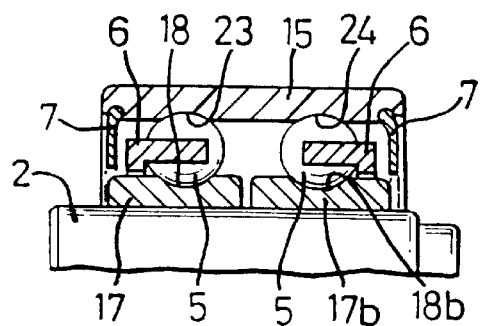

Although the main outer race groove 23 was formed directly in the inner peripheral wall of the main outer race 20 in the third embodiment described above, a pair of subordinate outer races 21,21a can be internally fitted in a main outer race 20A, which itself does not have any outer race groove, as in the fourth embodiment shown in FIGS. 4(A) and 4(B). Likewise, the first and second embodiments can also be constructed with a pair of inner races 17,17b externally fitted on the spindle 2 as illustrated in FIGS. 5(A) and 5(B) which show the fifth embodiment. Where subordinate races and inner races are each provided in a pair as described above, one or both of the subordinate outer races or inner races are displaced upon application of a preload.

Figure 6:
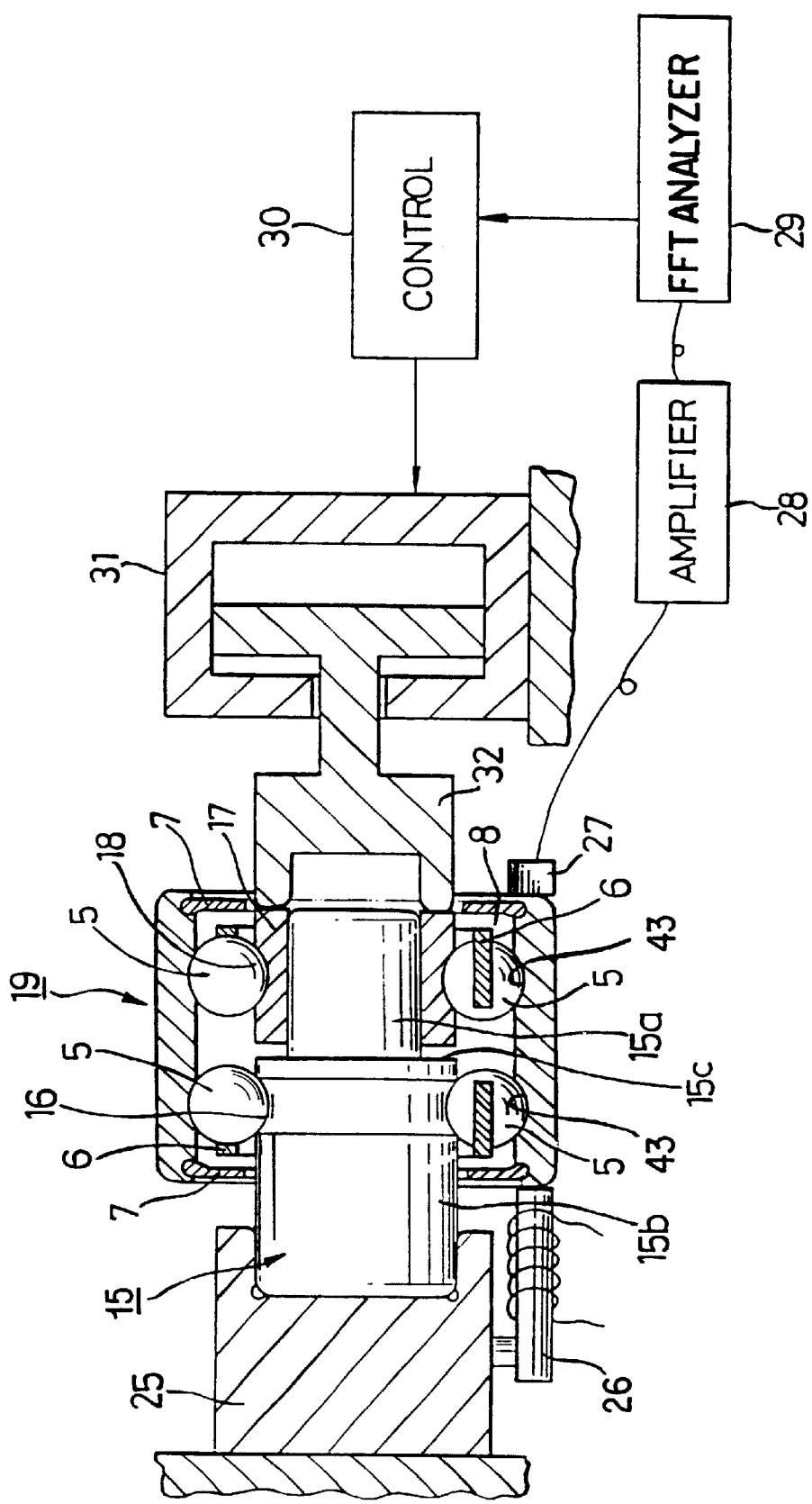
FIG. 6 is a cross-sectional view illustrating a first example of methods for adjusting a preload.

A description will next be made of a method for adjusting the displacement of the small-diameter portion 15a of the spindle 15 (or the large-diameter portion 20b of the main outer race 20) in order to perform application of an appropriate preload. FIG. 6 illustrates one example of the method. Upon assembling a preloaded rolling bearing manufactured by such a method as illustrated in FIG. 1, an end portion (a left-hand end portion as viewed in FIG. 6) of the spindle 15 is held-by-a-holder 25 and a vibrator 26 is brought into abutment against an end face (a left-hand end face as viewed in FIG. 6) of the outer race 19 to apply vibrations to the rolling bearing through the outer race 19. Further, a vibration sensor 27 is brought into abutment against an opposite end face (the right-hand end face as viewed in FIG. 6) of the outer race 19 so that a resonance frequency of the rolling bearing can be measured.

The resonance frequency of the rolling bearing, said resonance frequency having been detected by the vibration sensor 27, is inputted to a control 30 via an amplifier 28 and an FFT analyzer 29 which performs a fast Fourier transform (FFT). This control 30 governs a pusher 31 which is adapted to push the inner race 17 over the small-diameter portion 15a of the spindle 15. In the illustrated example, a hydraulic cylinder is used as the pusher 31. The control 30 governs the amount or pressure of a working fluid to be fed into the pusher 31, so that the force under which a pushing arm 32 of the pusher 31 pushes the inner race 17 can be adjusted.

Where an appropriate preload is applied to the individual balls 5,5 by pushing the inner race 17 over the small-diameter portion 15a upon manufacture of the rolling bearing, the working fluid is fed to the pusher 31 to push the inner race 17 by the pushing arm 32 while measuring the resonance frequency of the rolling bearing by the vibration sensor 27. As a result, the inner race 17 is press fitted on the small-diameter portion 15a of the spindle 17. When the resonance frequency has been brought substantially into conformity with a preset frequency, the feeding of the working fluid into the pusher 31 is stopped to complete the press fitting work so that the press fitting operation is finished. At this point, a rolling bearing applied with an appropriate preload has been completed.

Existence of a certain constant relationship between a resonance frequency and a preload of a rolling bearing is known for many years as disclosed, for example, in Japanese Patent Publication (Kokai) No. HEI 2-61700. If a resonance frequency of a rolling bearing having the same construction as a rolling bearing to be manufactured and applied with an appropriate preload is measured in advance and the value so measured is set at the control 30, feeding of the working fluid to the pusher 31 is stopped when the preload of the rolling bearing has reached the appropriate preload. It is necessary to perform only once the work which is required to apply the appropriate preload to the rolling bearing-for setting the resonance frequency. The efficiency of the manufacturing work is hence not impaired even if the work for applying the appropriate preload becomes cumbersome.

As the pusher 31 for pushing the inner race 17, an air cylinder or a feed screw can also be used besides such a hydraulic cylinder as illustrated in the drawing.

Figure 7:
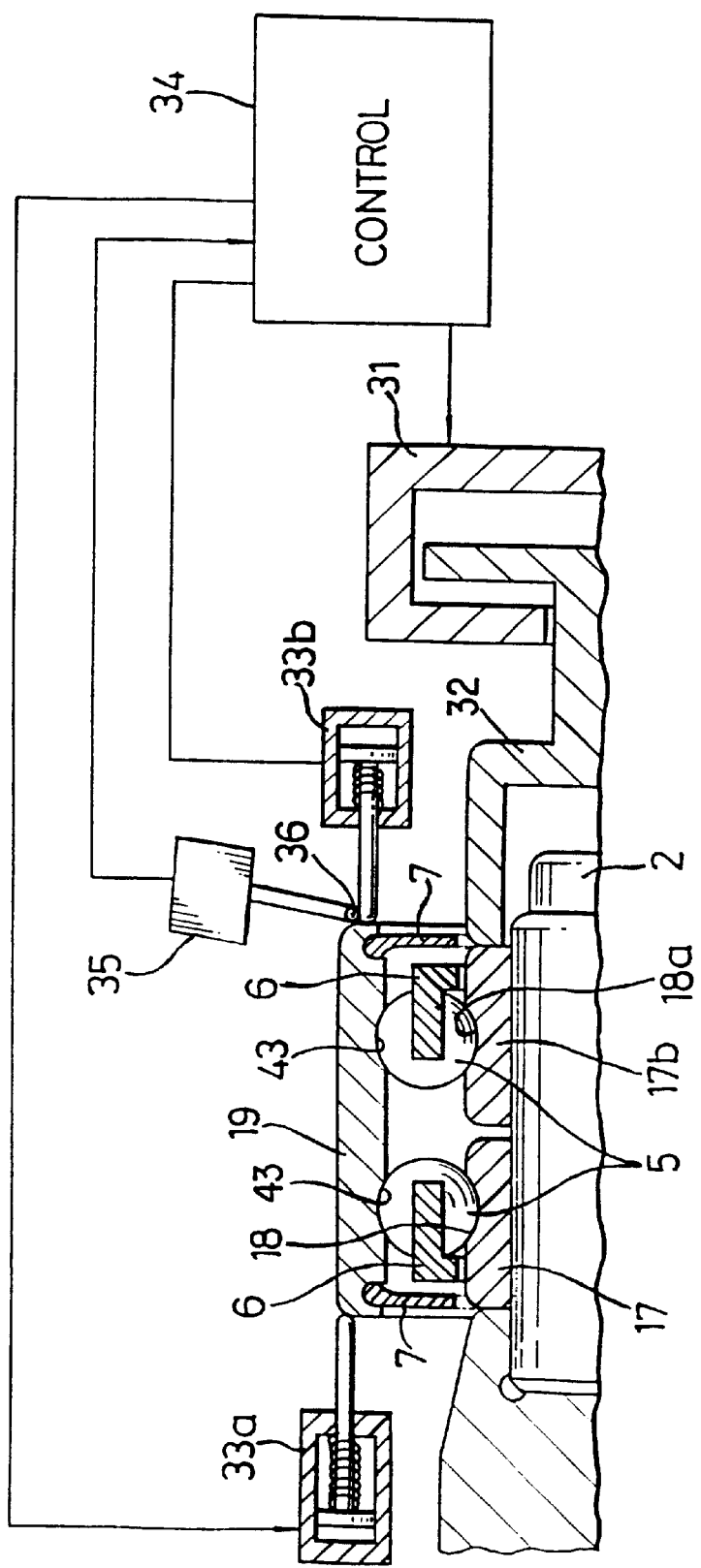
FIG. 7 is a cross-sectional view illustrating a second example of the methods for adjusting a preload.

Next, FIG. 7 illustrates a second example of the method for adjusting such a displacement. A manufacturing apparatus for applying an appropriate preload to a preloaded rolling bearing manufactured by such a method as shown in FIG. 5 is provided with a pair of pushers 33a,33b on opposite sides of the outer race 19, respectively. In the illustrated example, air cylinders are employed as the pushers 33a,33b. The amount or pressure of compressed air to be fed to the respective pushers 33a,33b is governed by the control 34. A probe 36 of a displacement sensor 35 is maintained in contact with an end face (a right-hand end face as viewed in FIG. 7) of the outer race 19 to permit the measurement of a displacement-of the outer race 19 in an axial direction (i.e., in a horizontal direction as viewed in FIG. 7). A measurement value of the displacement sensor 35 is inputted to-the control 34.

The control 34 governs the feeding of compressed air to the respective pushers 33a,33b and also the feeding of the working fluid to the pusher 31 adapted to push the inner race 17b. Where the inner race 17b is pushed onto the spindle 2 to apply an appropriate preload to the individual balls 5,5 upon manufacture of the rolling bearing, the paired pushers 33a,33b are operated alternately and while measuring by the displacement sensor 35 displacements of the outer race 19 caused by the alternate operation of the pushers 33a,33b, the working fluid is fed to the pusher 31 to push the inner race 17b by the pushing arm 31. As a consequence, the inner race 17b is press fitted on the spindle 2. When the displacement has become substantially equal to the preset value, the feeding of the working fluid to the pusher 31 is stopped to complete the pushing work.

It is also known for many years that there is a certain constant relationship between a displacement and a preload of a rolling bearing when a predetermined load is applied to the rolling bearing. If a displacement of a rolling bearing, which has the same construction as a rolling bearing to be manufactured and has been applied with an appropriate preload, upon application of a load to the former rolling bearing is measured beforehand and the value so measured is set at the control 34 in advance, the feeding of the working fluid to the pusher 31 is stopped when the preload of the rolling bearing has reached the appropriate value.

Figure 8:
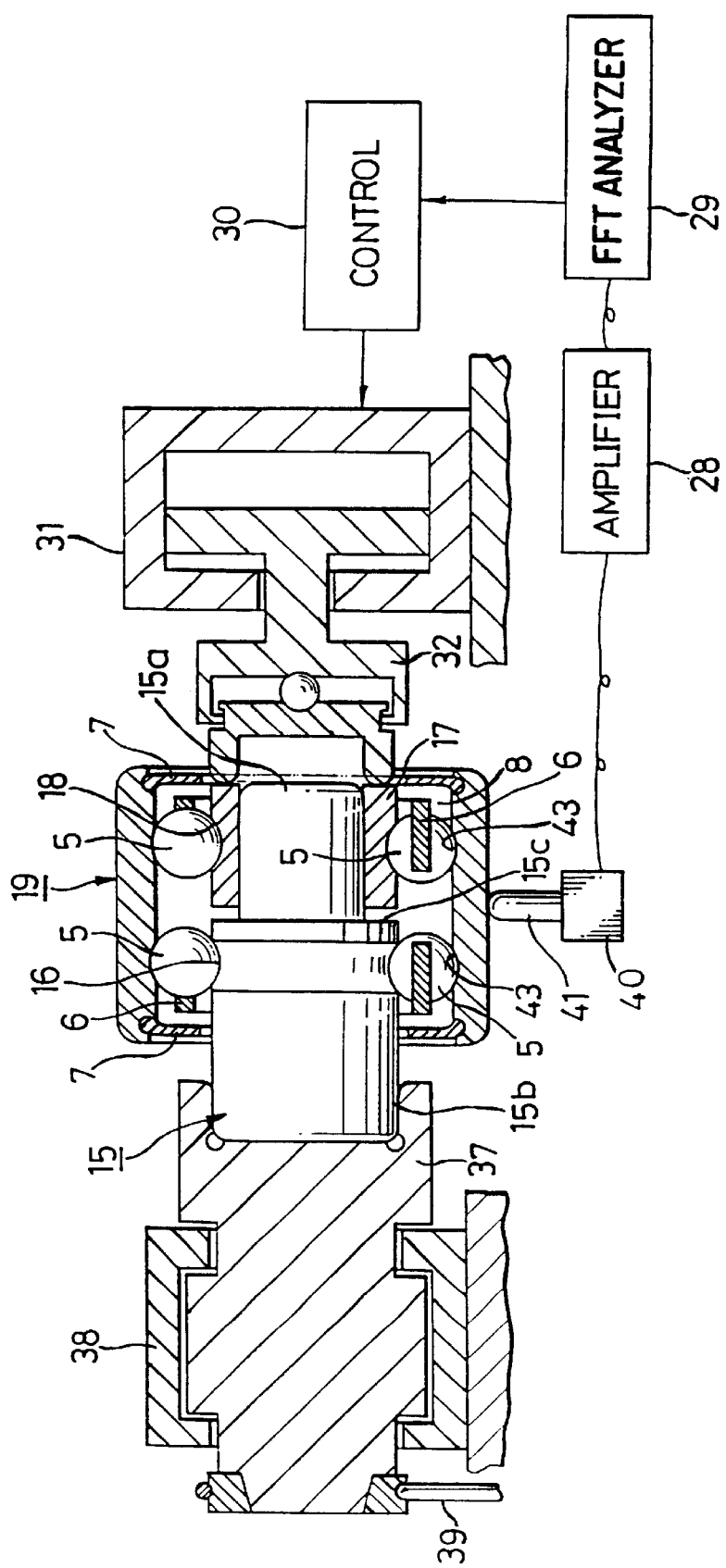
FIG. 8 is a cross-sectional view illustrating a third example of the methods for adjusting a preload.

Next, FIG. 8 illustrates a third example of the method for adjusting the displacement of the inner race 17 (or the subordinate outer race 21) relative to the small-diameter portion 15a of the spindle 15 (or the large-diameter portion 20b of the main outer race 20) in order to apply an appropriate preload to the rolling bearing. A holder 37 with an end portion (a left-hand end portion as viewed in FIG. 8) of the spindle 15 held thereby is rotatably supported by a gas bearing 38. The holder 37 and the spindle 15 are rotated by an unillustrated electric motor via a drive belt 39. A suitable stopper is applied to the outer race 19 arranged around the spindle 15 so that the outer race 19 is prevented from rotating upon rotation of the spindle 15. This stopper should be constructed in such a way that it does not prevent vibrations of the rolling bearing. A probe 41 of a vibration sensor 40 is maintained in contact with the outer peripheral wall of the outer race 19.

Where the inner race 17 is pushed onto the small-diameter portion 15a of the spindle 15 to apply an appropriate preload to the individual balls 5,5 upon manufacturing the rolling bearing, the working fluid is fed to the pusher 31 while performing an analysis of vibrational characteristics of the rolling bearing by the vibration sensor 40, namely, while conducting a frequency analysis of sounds or vibrations of the rolling bearing. By pushing the inner race 17 with the pushing arm 32, the inner race 17 is press fitted on the small-diameter portion 15a of the spindle 15. When the vibrational characteristics have been brought substantially into conformity with preset characteristics, the feeding of the working fluid to the pusher 31 is stopped to complete the press fitting work.

It is also known for many years that there is a constant relationship between vibrational characteristics and a preload of a rolling bearing. If vibrational characteristics of a rolling bearing, which has the same construction as a rolling bearing to be manufactured and has been applied with an appropriate preload, are analyzed beforehand and the data of the analysis are set at the control 30 in advance, the feeding of the working fluid to the pusher 31 is stopped when the preload of the rolling bearing has reached the appropriate value.

Figure 9:
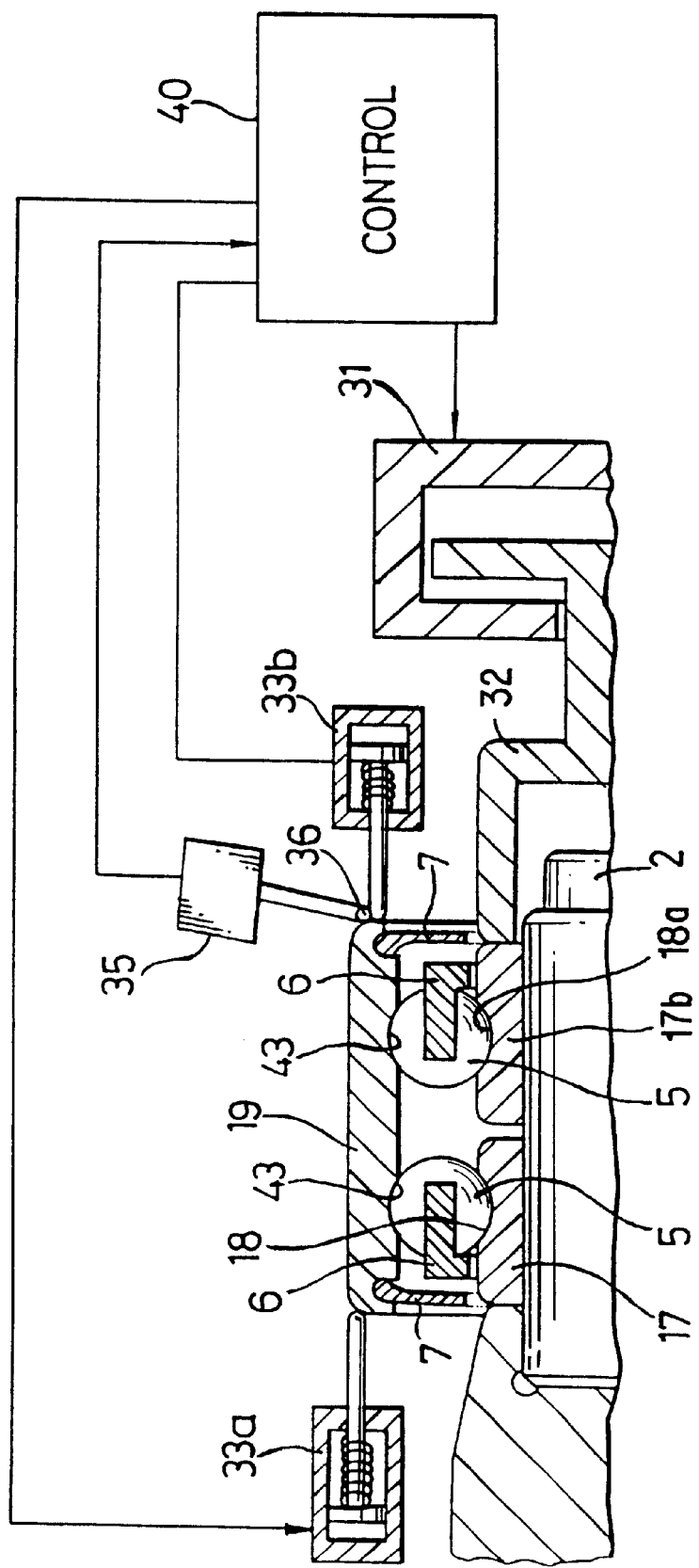
FIG. 9 is a cross-sectional view illustrating a fourth example of the methods for adjusting a preload.

Next, FIG. 9 illustrates a fourth example of the method for adjusting the displacement of the inner race 17 (or the subordinate outer race 21) relative to the small-diameter portion 15a of the spindle 15 (or the large-diameter portion 20b of the main outer race 20) in order to apply an appropriate preload to the rolling bearing. To manufacture a preloaded rolling bearing, the paired pushers 33a,33b are operated alternately while the plural balls 5,5 are maintained free from any preload. As a result, a load of a predetermined magnitude is axially (i.e., in a horizontal direction as viewed in FIG. 9) applied to the outer race 19 so that the outer race is axially displaced. The resulting displacement of the outer race 19 is then measured by the displacement sensor 35. The measurement value of the displacement sensor 35 is inputted to the control 40. Based on the measurement value, the control 40 then determines an axial play or clearance of the rolling bearing. The determination of the play or clearance from the displacement upon application of the predetermined load to the outer race 19 can be easily conducted in a manner known per se in the art.

Further, the control 40 actuates the pusher 31 to axially push the inner race 17b over a distance corresponding to the play or clearance so determined. After-the inner race 17b has been pushed in the axial direction, the balls 5,5 are in a preloaded state. In the present example, the distance over which the inner race 17b is pushed must be precisely controlled.

Figure 10:
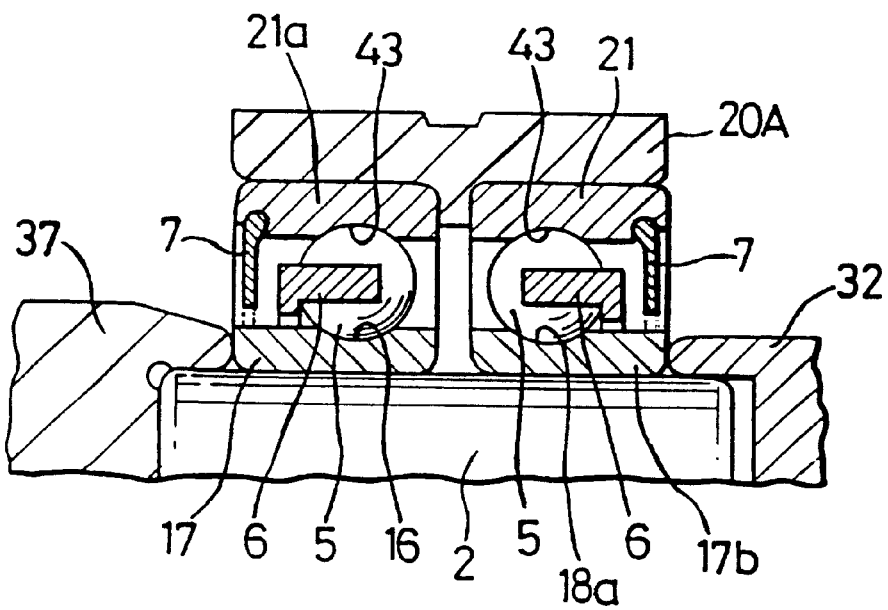
FIG. 10 is a cross-sectional view illustrating a fifth example of the methods for adjusting a preload.
Figure 11:
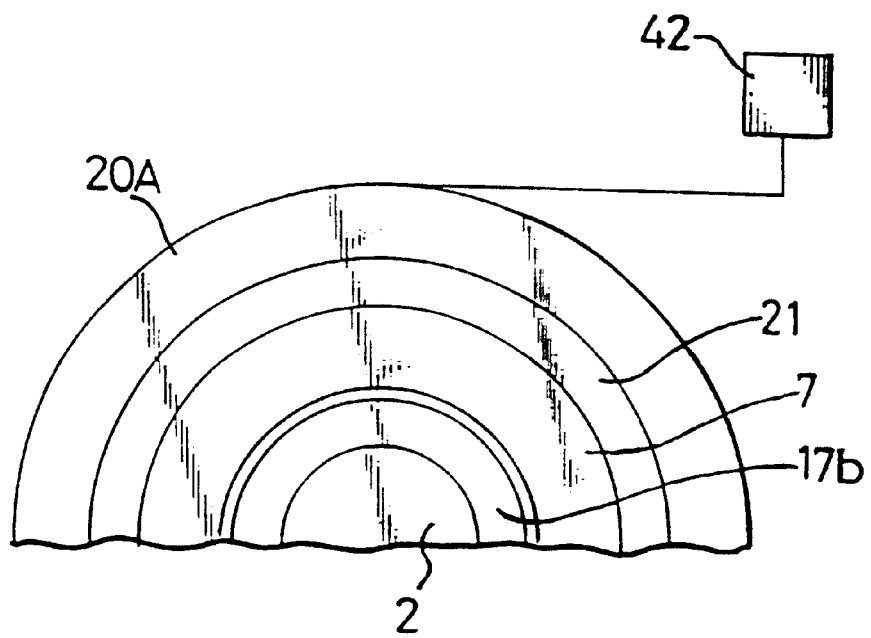
FIG. 11 is a side view of the bearing of FIG. 10, as viewed from a side in FIG. 10.
Figure 12A:
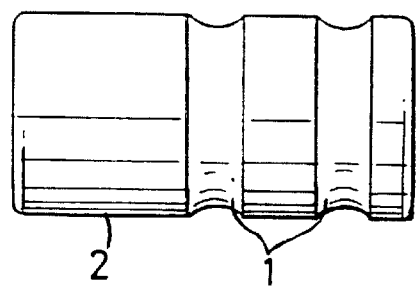
FIG. 12(A) through FIG. 12(C) are front or cross-sectional views showing parts of a rolling bearing known conventionally and the rolling bearing as completed.
Figure 12B:
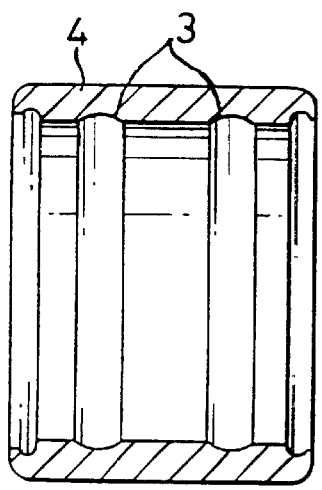
Figure 12C:
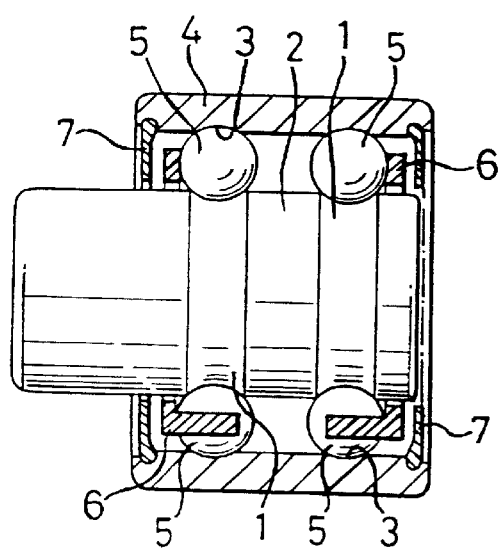

FIGS. 10 and 11, next, illustrates a fourth example of the method for adjusting the displacement of the inner race 17 (or the subordinate outer race 21) relative to the small-diameter portion 15a of the spindle 15 (or the large-diameter portion 20b of the main outer race 20) in order to apply an appropriate preload to the rolling bearing. To manufacture a preloaded rolling bearing, the spindle 2 is rotated via the holder 37, and while measuring by a load sensor 42 the rotational torque (torque loss) of the main outer race 20A which tends to rotate together with the spindle 2, the inner race 17b is pushed by the pushing arm 32 to press fit the inner race 17b on the spindle. When the torque loss has become substantially equal to a preset value, the pushing arm 32 is stopped to complete the press fitting work.

It has been known for many years that there is a constant relationship between a torque loss and a preload of a rolling bearing. If a torque loss of a rolling bearing, which has the same construction as a rolling bearing to be manufactured and has been applied with an appropriate preload, is analyzed beforehand and the measurement value is set at a control in advance, the pushing arm 32 is stopped when the preload of the rolling bearing has reached the appropriate value.

It is to be noted that the above-described preloading methods of FIGS. 6 to 9 can also be used upon manufacture of a double-row, tapered roller bearing or when two single-row rolling bearings are combined to construct a rolling bearing in which the rolling bearings are each applied with a predetermined preload.

Each preloading method according to the present invention can also be used to adjust the preload of a invention can also be used to adjust the preload of a rolling bearing upon assembling the rolling bearing in a motor of HDD as shown in FIGS. 19 to 23.

Figure 19:
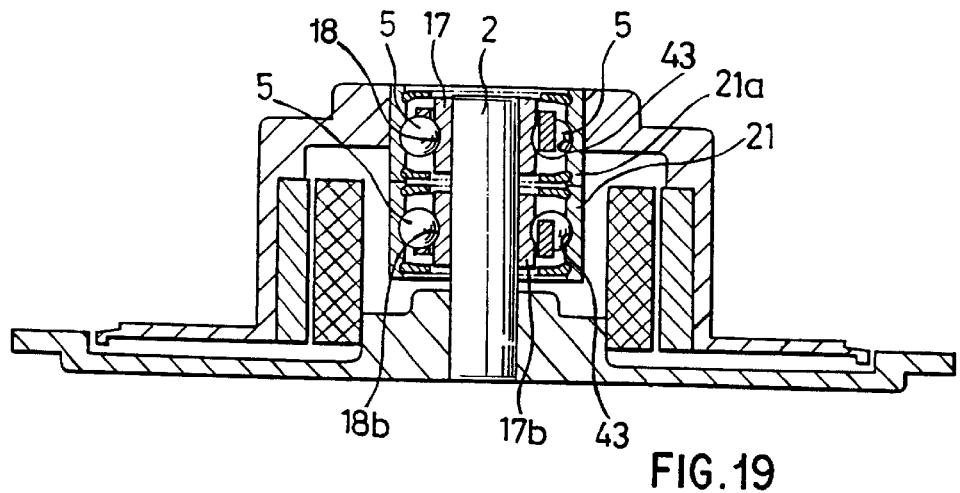
FIG. 19 is a cross-sectional view showing a method for adjusting a preload of a bearing upon its assembly in a motor for HDD.

In FIG. 19, two outer races 21,21a are in direct contact to each other in a preloading direction, and a spindle 2 and inner races 17,17b are fitted together with sufficient strength of fitting. A motor is rotated, and while measuring vibrations, the inner race 17 is pushed toward the inner race 17b. The pushing of the inner race 17 is stopped when the characteristics of the vibrations have become equal to preset vibrational characteristics.

Figure 20:
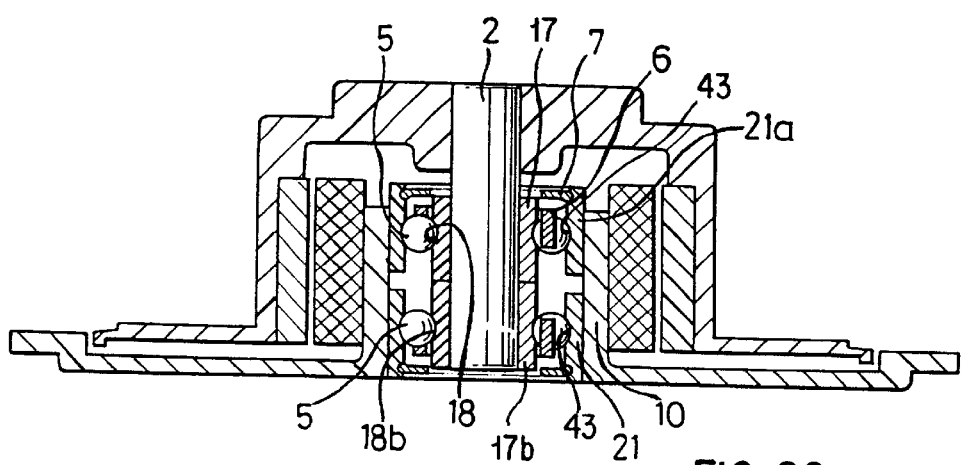
FIG. 20 is a cross-sectional view showing a modification of the method of FIG. 19.

FIG. 20 illustrates a modification in which the outer races 21,21a are maintained in contact with each other via a flange of a housing 10.

Figure 21:
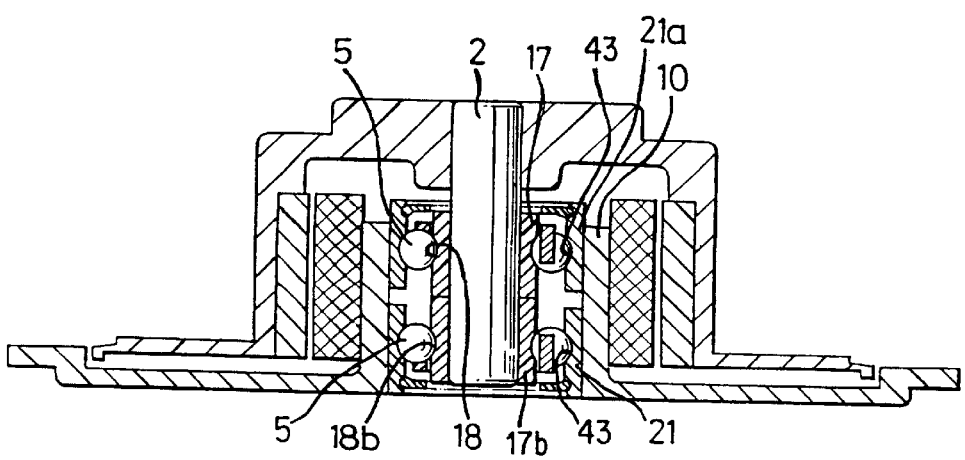
FIG. 21 is a cross-sectional view illustrating another modification of the method of FIG. 19.

Another modification is illustrated in FIG. 21. the inner races 17,17b are maintained in direct contact to each other in a preloading direction, and the outer races 21,21a are fitted in the housing 10 with sufficient strength of fitting. Like the preloading method of FIG. 19, preloading is conducted by pushing the outer race 21 toward the outer race 21a while rotating the motor.

Figure 2E:
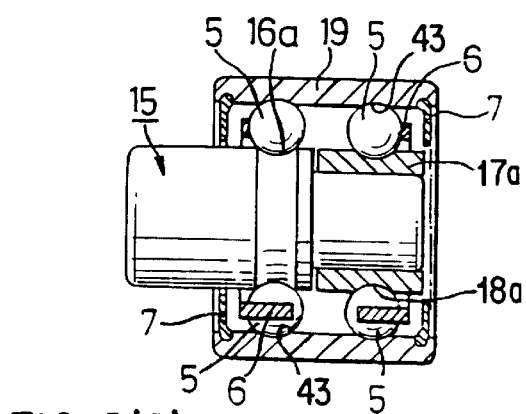
Figure 22:
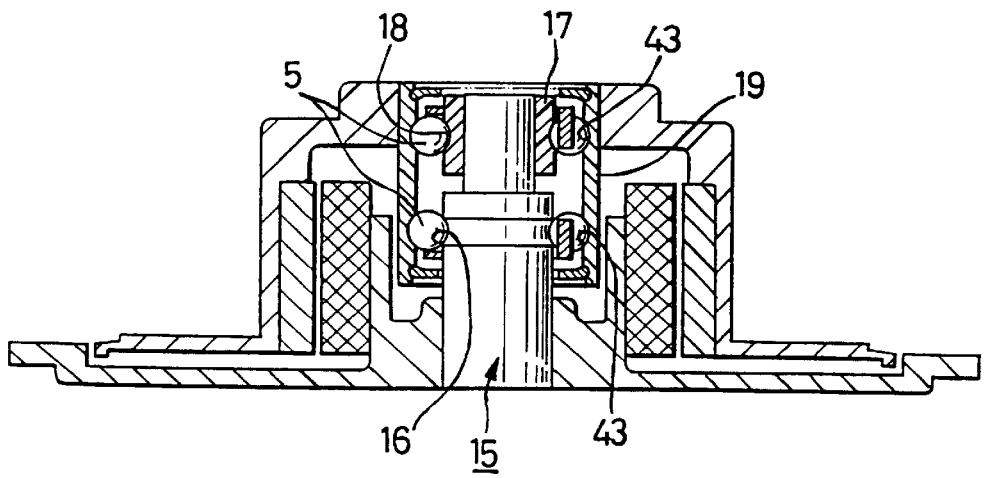
FIG. 22 is a cross-sectional view of the ball bearing of FIG. 2(E) as assembled in a motor.

In FIG. 22, the rolling bearing of FIG. 2(E) has been assembled in a motor. Like the preloading method adjusted by pushing the inner race 17 while rotating the motor.

Figure 23:
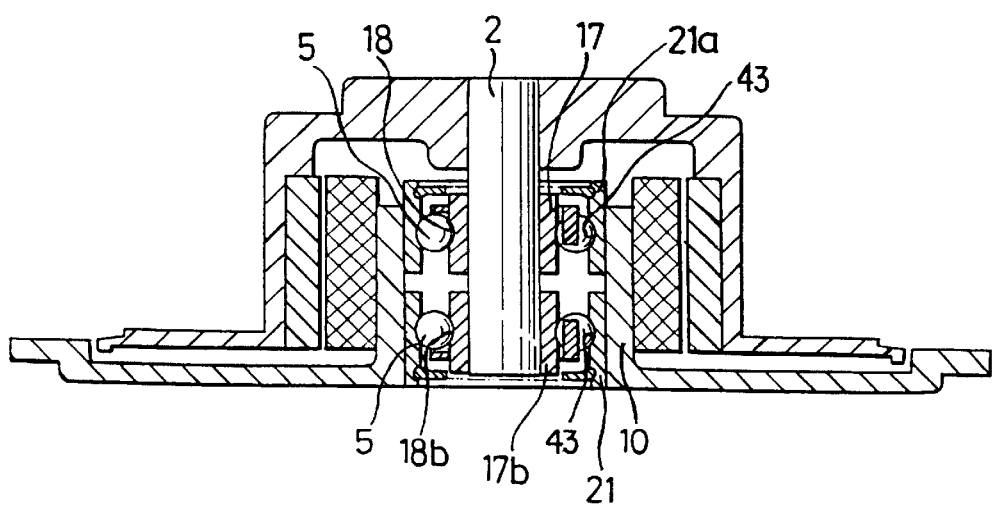
FIG. 23 is a cross-sectional view illustrating a still further method for adjusting a preload.

A still further modification is shown in FIG. 23, in which the outer races 21,21a and the housing 10 are fitted together with sufficient strength of fitting and the inner races 17,17a and the spindle 2 are also fitted together with sufficient strength of fitting. The extent of pushing of each of the inner race 17b and the outer race 21 can be adjusted as in the method of FIG. 19.

Incidentally, the outer races 21 and 21a are arranged in direct contact to each other in FIG. 19. A spacer may be interposed therebetween. As a further alternative, they may be formed as an integral unit.

Further, the inner races 17 and 17b are disposed in direct contact to each other in FIG. 21. A spacer may be interposed therebetween. They may be formed as an integral unit. As a still further alternative, they may be arranged integrally with the spindle as in FIG. 3(E).

Figure 24:
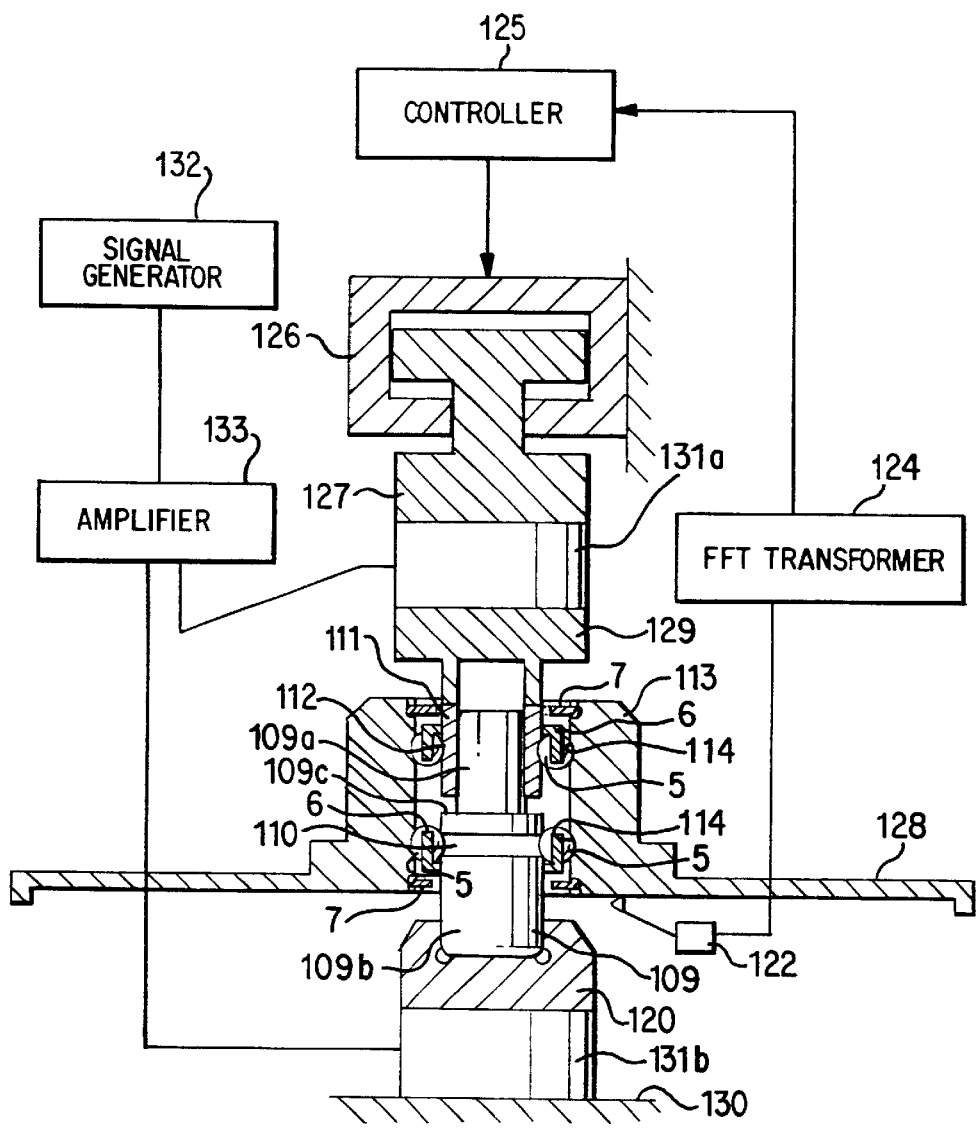
FIG. 24 is a cross sectional view of a first embodiment of the present invention.
Figure 25:
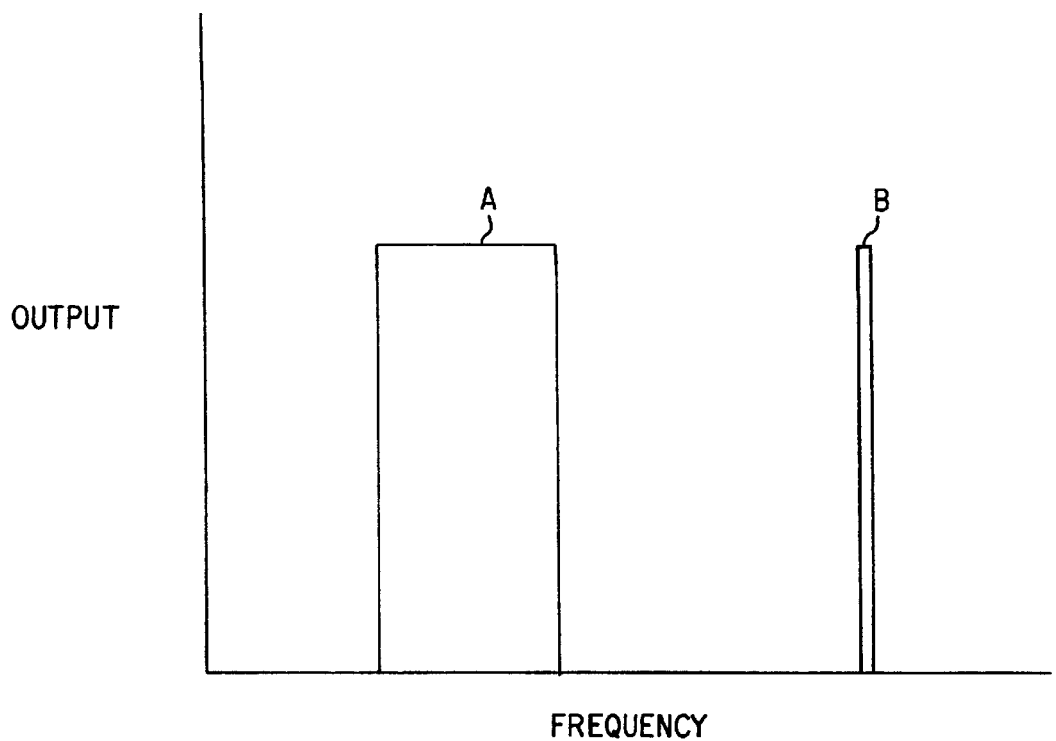
FIG. 25 is a graph showing an output of a signal generator for applying vibrations.

FIGS. 24 and 25 illustrate a first embodiment of the present invention. A shaft 109 (also referred to as first member) is formed with a smaller diameter portion 109a and a larger diameter portion 109b connected together by a step portion 109c, and a first inner raceway 110 (also referred to as first raceway) of the deep groove type on an outer peripheral face of the larger diameter portion 109b (also referred to as first peripheral face). Moreover, an inner ring 111 (also referred to as third member) has an inner diameter slightly smaller than the outer diameter of the small diameter portion 109a in an unfitted or free condition, and is formed with a second inner raceway 112 (also referred to as fourth raceway) of the deep groove type on an outer peripheral face (also referred to as third peripheral face) thereof. Furthermore, an outer ring 113 (also referred to as second member) is formed with two outer raceways 114 (also referred to as second and third raceways) of the deep groove type on an inner peripheral face (also referred to as second peripheral face) thereof, and on an outer peripheral face of the outer ring 113, a hub 128 is provided for supporting a hard disk.

The abovementioned shaft 109, inner ring 111, and outer ring 113 are assembled together with the inner ring 111 press-fitted around the shaft 109, and with balls 5 installed between the respective first and second inner raceways 110 and 112 and the two outer raceways 114, with the balls 5 retained by retainers 6. At the time of this assembly, the respective balls 5 have not yet been subjected to preloading.

With the respective components assembled in the above manner, the shaft 109 is engagingly supported in a support means 120, and the end rim of a press frame 129 is abutted against the end face of the inner ring 111. Then with operation of the press means 126, the spacing between the support means 120 and the press frame 129 is reduced so that the inner ring 111 is pressed over the small diameter portion 109a of the shaft 109 to thereby apply a preload to the respective balls 5.

Piezo electric elements 131a and 131b are interposed respectively between the support means 120 and a base member 130, and between the press frame 129 and a press arm 127. The piezo electric elements 131a and 131b have sufficient rigidity in the direction of pressing of the inner ring 111 (the vertical direction in FIG. 24). The piezo electric elements 131a and 131b are driven by an amplifier 133 in accordance with a signal such as shown in FIG. 25, from a signal generator 132.

In the embodiment illustrated in FIGS. 24 and 25, the signal generator 132, as well as outputting a signal A (FIG. 25) for use in detecting the resonance frequency of the rolling bearing unit, outputs a signal B for reducing the force required for pressing the inner ring 111 onto the small diameter portion 109a, that is for reducing the so-called "stick slip". Furthermore, the pair of piezo electric elements 131a and 131b drive in opposite phase with the same amplitude. That is to say, when the piezo electric elements 131a extends, the other piezo electric element 131b contracts by the same amount. This prevents pressing of the inner ring 111 onto the smaller diameter portion 109a with vibration of the rolling bearing unit by both piezo electric elements 131a and 131b, and thus enables the shaft 109 and the inner ring 111 to be sufficiently vibrated in the axial direction. Otherwise, the pressing operation of the inner ring 111 onto the smaller diameter portion 109a would be carried out if both of the piezo electric elements 131a and 131b extend together.

A probe of a vibration sensor 122 is abutted against the lower end face of the outer ring 113, and the output from the vibration sensor 122 is input to the controller 125 by way of the FFT transformer 124. The controller 125 controls the positional change amount of the press arm 127 due to operation of the press means 126.

When constructing the rolling bearing unit, the application of an appropriate preload to the respective balls 5, involves the step of measuring the resonant frequency of the rolling bearing unit with the vibration sensor 122, while supplying hydraulic oil to the press means 126 to press the inner ring 111 with the press arm 127, so as to press fit the inner ring 111 onto the small diameter portion 109a of the shaft 109. When the resonant frequency is approximately equal to a previously set frequency, the hydraulic oil supply to the press means 126 is stopped, thus terminating the press operation and completing the preloading of the rolling bearing unit with an appropriate preload.

With the manufacturing method for the preloaded rolling bearing unit according to the present invention however, since the rolling bearing unit can be efficiently vibrated with the pair of piezo electric elements 131a and 131b, the resonance frequency can be reliably detected with a minimum consumption of energy.

Moreover, with the present invention, since a vibration is also applied to the rolling bearing unit by means of the pair of piezo electric elements 131a and 131b in order to reduce the "stick slip", the necessary force for pressing the inner ring 111 is stable. This is based on the facts, as is known and disclosed for example in Japanese Patent First Publication KOKAI Number 3-113114, that the frictional forces acting between the mutually contacting members can be reduced by applying a vibration having a predetermined frequency.

With the present embodiment, a vibration having a frequency to reduce the friction is applied to the rolling bearing unit so that the friction acting between the inner peripheral face of the inner ring 111 and the outer peripheral face of the small diameter portion 109a is reduced. Accordingly, with the embodiment, the force from the press means 126 for pressing the inner ring 111 is also smaller and stable. The vibration for reducing the "stick slip" may be applied to only the one piezo electric element 131a provided between the press frame 129 and the press arm 127.

Figure 26:
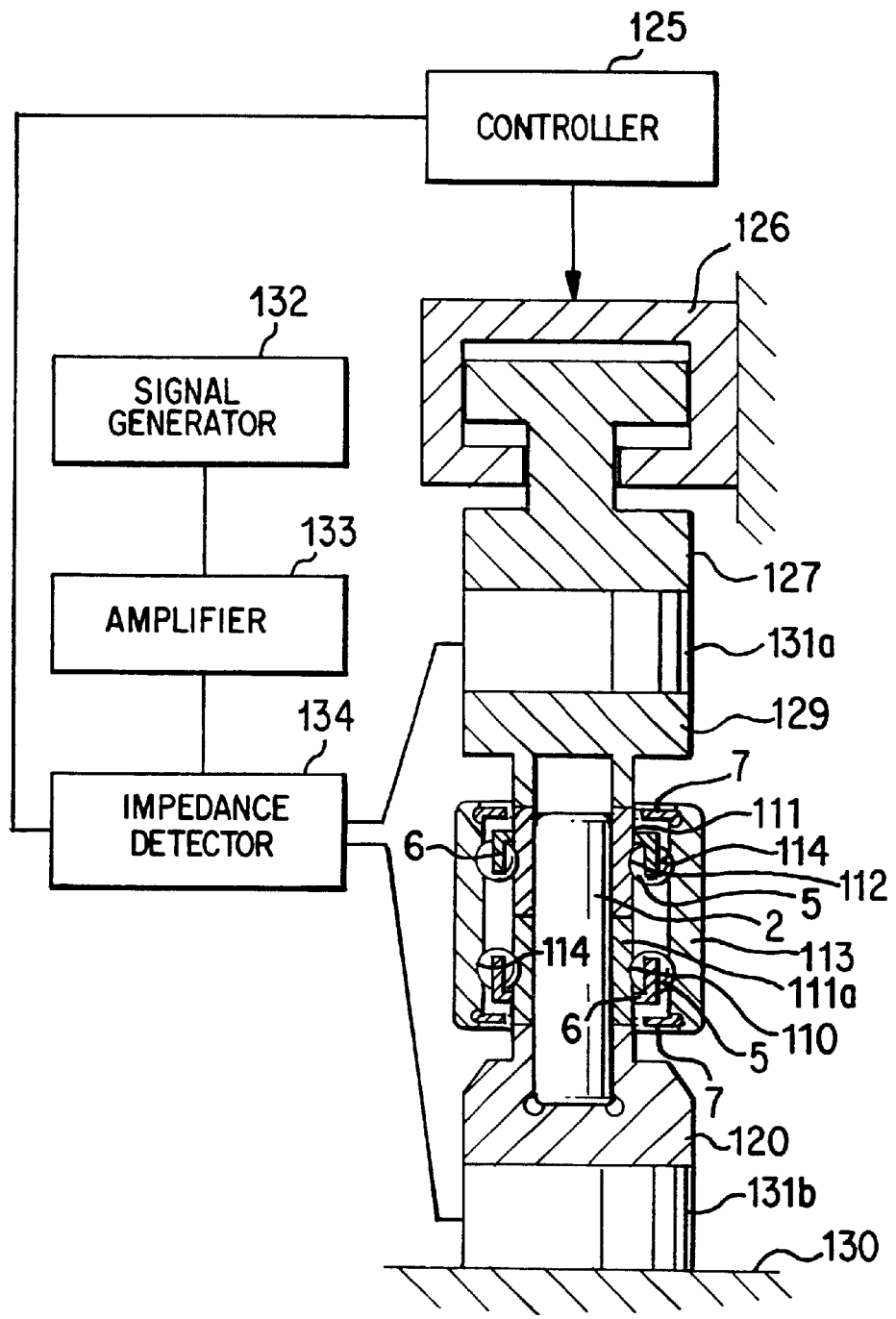
FIG. 26 is a cross sectional view of a second embodiment of the present invention.
Figure 27:
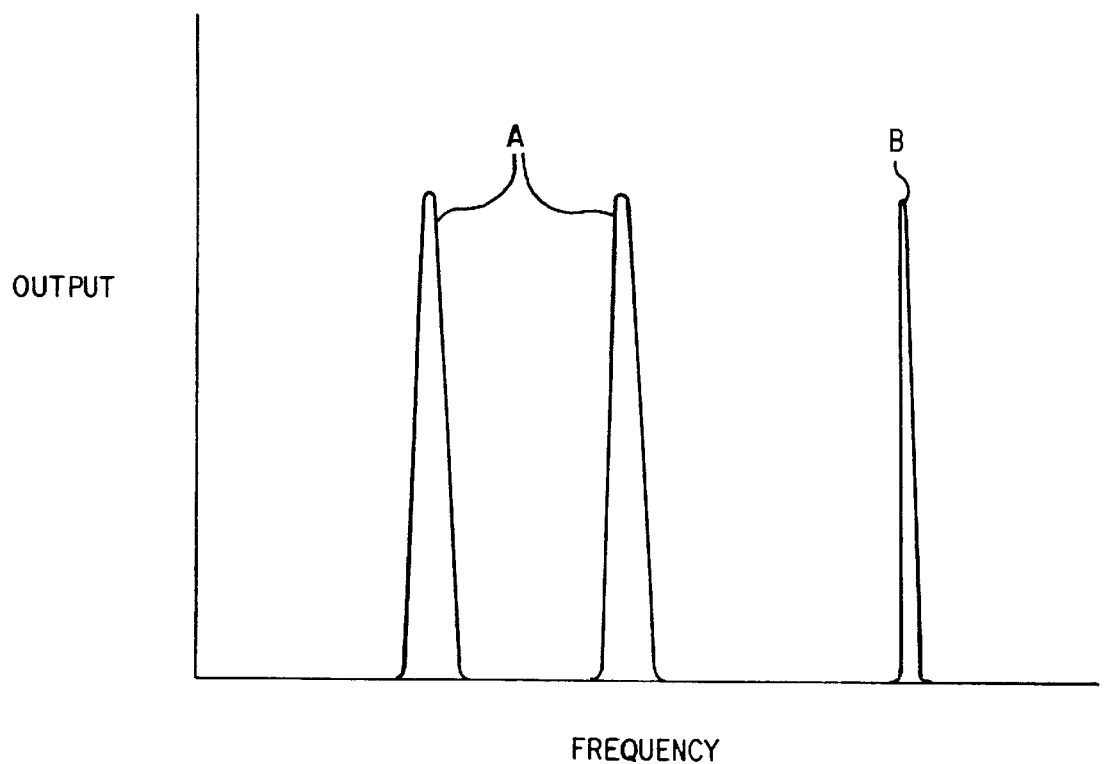
FIG. 27 is a graph showing an output of a signal generator for applying vibrations.

A second embodiment according to the present invention is shown in FIG. 26. With this embodiment, the rolling bearing unit incorporates a pair of inner raceways 111 and 111a press fitted over the shaft 2 in a similar manner to that shown in FIG. 5(A) and FIG. 5(B). The vibration sensor 122 of FIG. 24 for detecting the vibration of the rolling bearing unit has been omitted and in its place is provided an impedance detector 134 for detecting the impedance of a signal sent from the amplifier 33 to the respective piezo electric elements 131a and 131b. When pressing the inner ring 111 onto the smaller diameter portion 9a, signals A for detection of the resonance frequency of the rolling bearing unit as shown in FIG. 27, and a signal B for reducing the "stick slip", are output from the signal generator 132, with the press operation being carried out while vibrating the respective piezo electric elements 131a and 131b in accordance with these signals A and B.

The resonance frequency of the rolling bearing unit is changed with progress of the press operation, the impedance of the signal is changed. When the impedance attains a predetermined value, the press operation of the press means 126 on the inner ring 111 is stopped, giving a rolling bearing unit to which a predetermined preload has been applied. Other construction and operation is the same as for the above described first embodiment.

Figure 28:
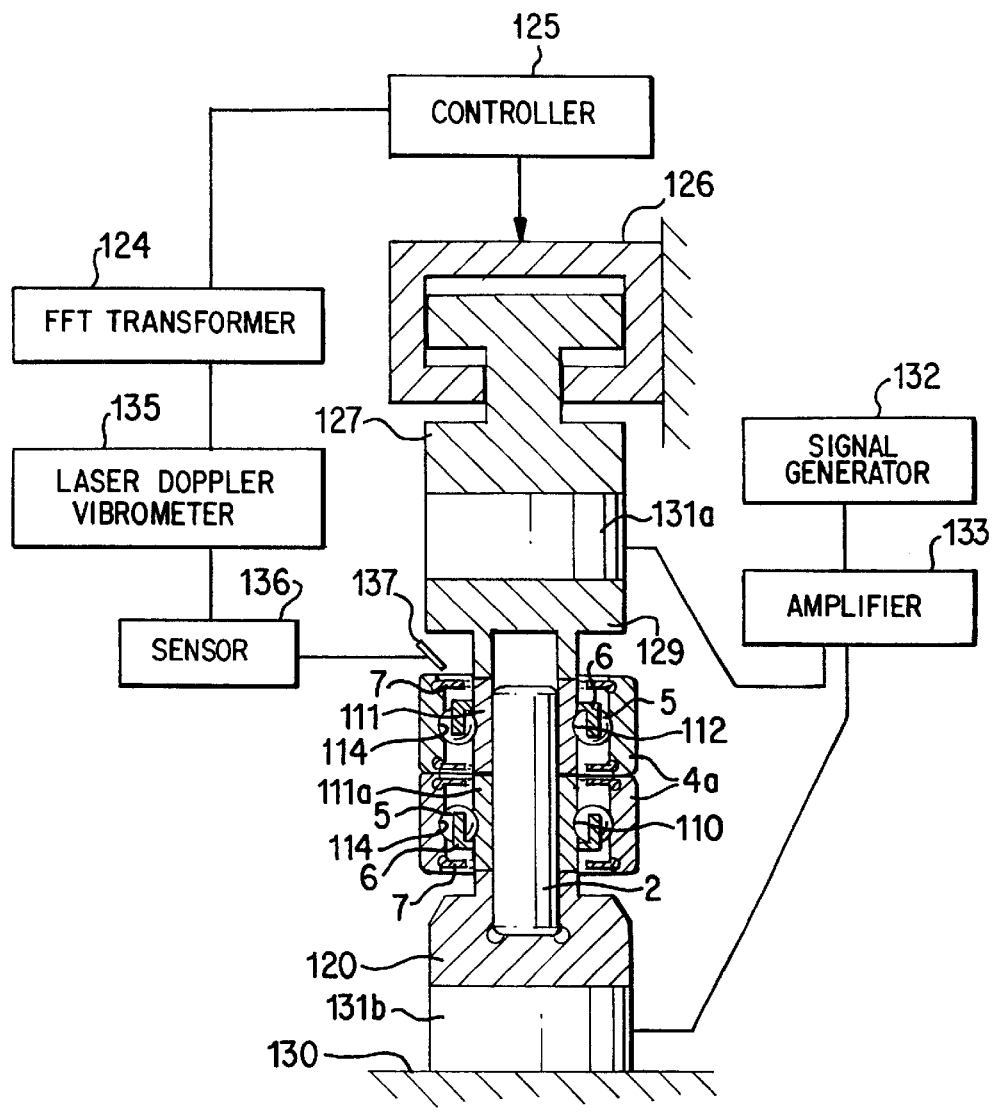
FIG. 28 is a cross sectional view of a third embodiment of the present invention.

A third embodiment according to the present invention is shown in FIG. 28. With this embodiment, the rolling bearing unit incorporates a pair of inner raceways 111 and 111a press fitted over the shaft 2 in a similar manner to that shown in FIGS. 5(A) and 5(B). Moreover, a pair of separate outer rings 4a are provided to have the end faces which are abutted together to function like a single outer ring.

Furthermore, with this embodiment, at the time of pressing the inner ring 111, the vibration of the rolling bearing unit is detected by a non contact method using a laser doppler vibrometer 135. This involves a sensor portion 136 for receiving/transmitting laser light, and a mirror 137 for reflecting laser light between the sensor portion 136 and the inner ring 111.

The vibration of the rolling bearing unit detected by the laser doppler vibrometer 135 is sent to a controller 125 via a FFT transformer 124 to thereby control the press means 126 for pressing the inner ring 111. Other construction and operation is the same as for the above described first embodiment.

Figure 29:
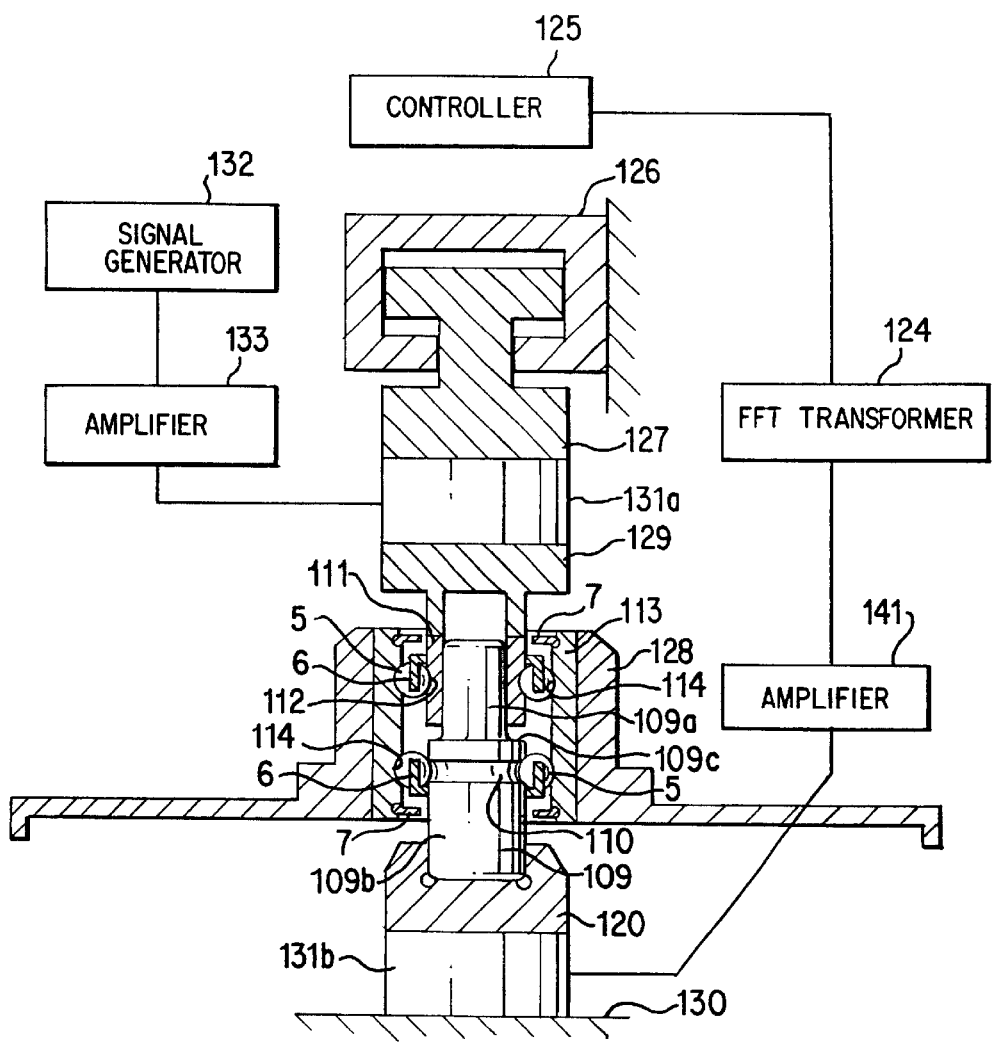
FIG. 29 is a cross sectional view of a fourth embodiment of the present invention.

A fourth embodiment according to the present invention is shown in FIG. 29. With this embodiment, the respective signals for detecting the resonance frequency of the rolling bearing unit and for reducing the "stick slip" are applied from a signal generator 132 by way of an amplifier 133 to only the piezo electric element 131a provided between the press frame 129 and the press arm 127, with the other piezo electric element 131b used to detect the vibration of the rolling bearing unit. The detection value from the piezo electric element 131b is input to the controller 125 by way of the amplifier 141 and the FFT transformer 124. Other construction and operation is the same as for the above described first example.

Figure 30:
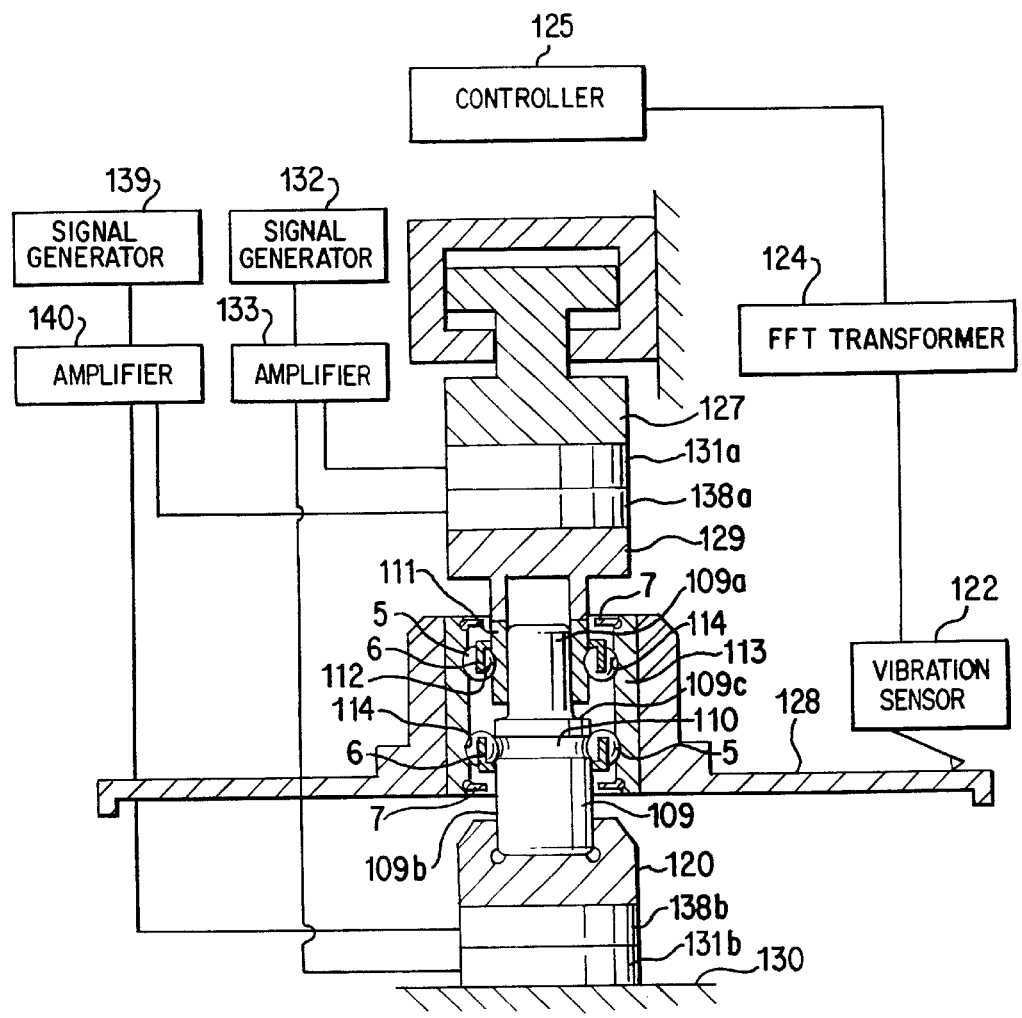
FIG. 30 is a cross sectional view of a fifth embodiment of the present invention.

A fifth embodiment according to the present invention is shown in FIG. 30. With this example, a total of two pairs of piezo electric elements 131a, 131b, 138a and 138b are respectively interposed between the base member 130 and support means 120, and between the press frame 129 and press arm 127. Of these two pairs of four piezo electric elements 131a, 131b, 138a and 138b, piezo electric elements 131a and 131b vibrate in the axial direction (vertical direction in FIG. 30) in accordance with the electrical supply, while piezo electric elements 138a and 138b vibrate in a direction perpendicular to the axial direction (in a plane perpendicular to the plane of FIG. 30).

A signal for reducing the "stick slip" is applied to the piezo electric elements 131a and 131b, from a signal generator 132 by way of an amplifier 133, while a signal for resonance frequency detection is applied to the piezo electric elements 138a and 138b from a signal generator 139 by way of an amplifier 140. The probe of the vibration sensor 122 used for detecting the resonance frequency is contacted against the side face of the hub 128 near the outer periphery thereof. The vibration for resonance frequency detection applied to the rolling bearing unit from the respective piezo electric elements 138a and 138b is in a direction perpendicular to the axis. However since the portion of the hub 128 near its outer periphery will also vibrate in the axial direction in accordance with this vibration, the resonance frequencies can be freely detected. With this example, the hub 128 is formed separately from the outer ring 113 and is then press fitted around the outer ring 113. Other construction and operation is the same as for the above described first embodiment.

Figure 31:
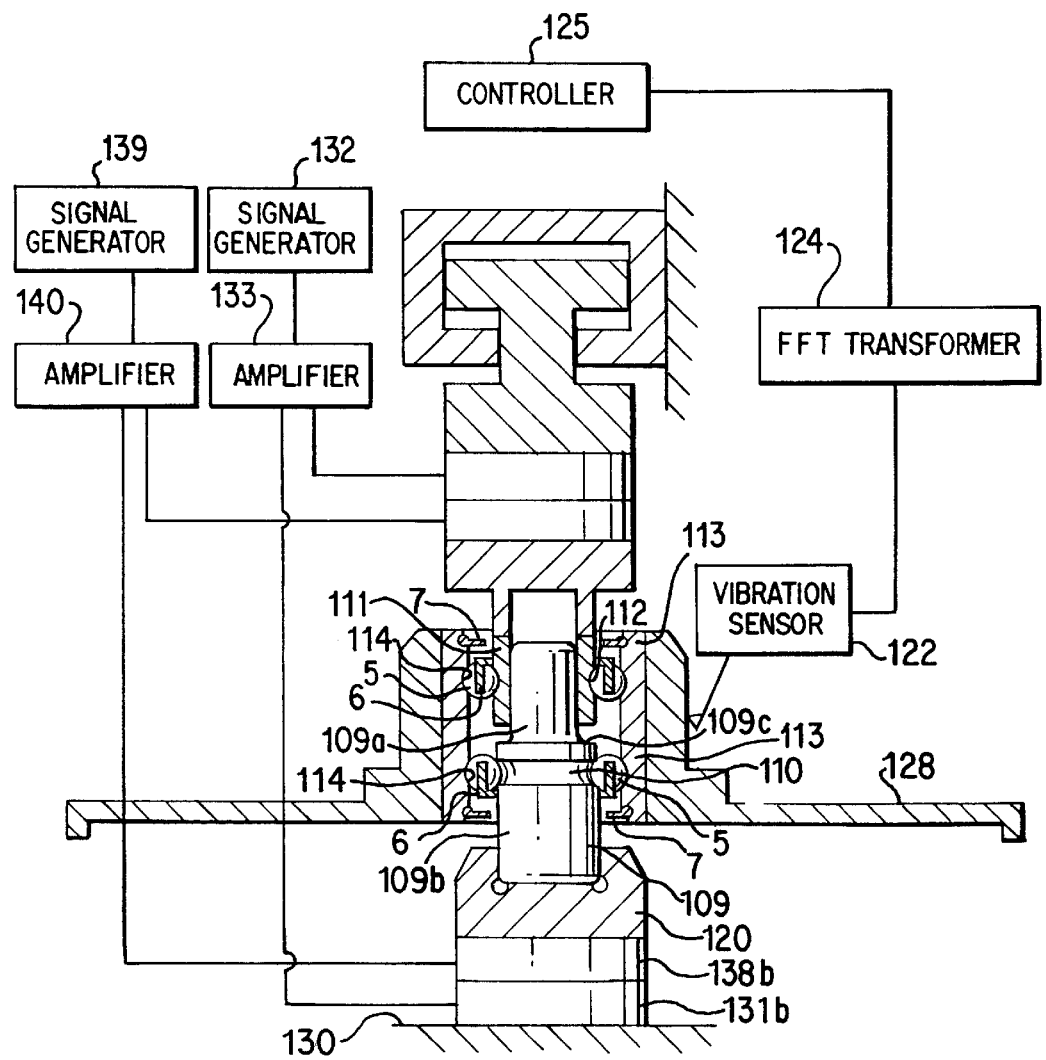
FIG. 31 is a cross sectional view of a sixth embodiment of the present invention.

A sixth example according to the present invention is shown in FIG. 31. With this embodiment, the probe of the vibration sensor 122 is contacted against the outer peripheral face of the base portion of the hub 128 so that the vibration of the rolling bearing unit in the direction perpendicular to the axial direction can thus be detected. Other construction and operation is the same as for the above described fifth embodiment.

With the method of manufacturing the preloaded rolling bearing unit according to the present invention as described above, the assembly operation for the rotating support member of the spindle can be easily carried out. Preloaded rolling bearing units required for highly accurate rotational support can thus be manufactured to a small size and at low cost. Furthermore, since there is no scratching of the raceway and rotating surfaces at the time of construction, the performance, durability and reliability of the resultant rolling bearing unit can be increased. Also, since further adjustment after pre loading is possible, an appropriate preload to suit the device into which the rolling bearing unit is assembled can be obtained.

The following are embodiments of controlling the preload in the method of preloading the preload-adjustable bearing apparatus as mentioned above.

The preload-adjustable bearing apparatus comprises first and second members which are relatively rotatable to each other, and first and second ball rows which are provided radially between the first and second members and have a plurality of balls, respectively.

Here, the term "preload-adjustable bearing apparatus" includes those the assembly of which is not completed.

The first member has first and second raceways which are axially juxtaposed and prevented from being closer to each other.

Here, the term "raceway" is used to mean the raceway itself or what defines the raceway.

The second member having a third raceway which is opposed to the first raceway of the first member with the first ball row therebetween, and a fourth raceway which is axially juxtaposed to the third raceway and opposed to the second raceway of the first member with the second ball row therebetween.

The third raceway is prevented from being more spaced on the second member from the fourth raceway.

The fourth raceway is fitted onto the second member in a relatively movable interference relationship, such that the fourth raceway is movable toward the third raceway with an axial force relatively applied to the fourth raceway and the second member.

The method for controlling the preload comprises the steps of relatively applying the axial force to the fourth raceway and the second member so as to move the fourth raceway closer to the third raceway while detecting a parameter of press-in condition and stopping the axial force when the parameter reaches a predetermined value, thereby applying a preload to the bearing apparatus.

The parameter of press-in condition may be a rotation vibration of the bearing apparatus, and the fourth raceway is moved closer to the third raceway while detecting the rotation vibration of the bearing apparatus, and stopped when the rotation vibration of the bearing apparatus reaches a predetermined value.

The rotation vibration is produced in one of a moment direction, in a direction perpendicular to the axis, and in an axial direction.

The parameter of press-in condition may be a rotation sound of the bearing apparatus, and the fourth raceway is moved closer to the third raceway while detecting the rotation sound of the bearing apparatus, and stopped when the rotation sound of the bearing apparatus reaches a predetermined value.

The parameter of press-in condition may be a response to a vibration applied to the bearing apparatus, and the fourth raceway is moved closer to the third raceway while detecting the response, and stopped when the response reaches a predetermined value.

The parameter of press-in condition may be a rotation torque of the bearing apparatus, and the fourth raceway is moved closer to the third raceway while detecting the torque, and stopped when the torque reaches a predetermined value.

The parameter of press-in condition may be an electric power consumption in rotation of the bearing apparatus, and the fourth raceway is moved closer to the third raceway while detecting the electric power consumption, ad stopped when the electric power consumption reaches a predetermined value.

The parameter of press-in condition may be a pressure on the fourth raceway moved closer to the third raceway, and the fourth raceway is moved closer to the third raceway while detecting the pressure, and stopped when the pressure increases a predetermined value.

In this case, it is desirable for smooth operation that a temperature difference is produced between the fourth raceway and the second member to reduce or eliminate the interference, and removed after the fourth raceway moved closer to the third raceway is stopped.

The parameter of press-in condition may be a capacitance between the radially opposed raceways with the balls therebetween, and the fourth raceway is moved closer to the third raceway while detecting the capacitance, and stopped when the capacitance reaches a predetermined value.

The parameter of press-in condition may be an electric resistance between the radially opposed raceways with the balls therebetween, and the fourth raceway is moved closer to the third raceway while detecting the electric resistance, and stopped when the electric resistance reaches a predetermined value.

The parameter of press-in condition may be a deformation of at least one of the raceways, and the fourth raceway is moved closer to the third raceway while detecting the deformation, and stopped when the deformation reaches a predetermined amount. The deformation may be in the axial, radial or circumferential direction.

The parameter of press-in condition may the amount of axial displacement of the second member with reference to the first member when subjected to predetermined bilateral loads relatively applied to the first and second members of the bearing apparatus, and the fourth raceway is moved closer to the third raceway while detecting the movement, and stopped when the movement reaches a predetermined amount.

The parameter of press-in condition may be bilateral loads required for predetermined axial displacements of the second member toward the first member of the bearing apparatus, and the fourth raceway is moved closer to the third raceway while detecting the load, and stopped when the load reaches a predetermined amount.

Another method of controlling the preload is directed to the preload-adjustable bearing apparatus comprising first and second members which are relatively rotatable to each other, and first and second ball rows which are provided radially between the first and second members and have a plurality of balls, respectively, the first member having first and second raceways which are axially juxtaposed and prevented from being closer to each other than a predetermined distance, the second member having a third raceway which is opposed to the first raceway of the first member with the first ball row therebetween, and a fourth raceway which is axially juxtaposed to the third raceway and opposed to the second raceway of the first member with the second ball row therebetween, the third and fourth raceways fitted onto the second member in a relatively movable interference relationship, such that the third and fourth raceways are movable toward the each other with an axial force relatively applied to the third and fourth raceways.

The control method comprises the steps of relatively applying the axial force to the third and fourth raceways so as to move the third and fourth raceways closer to each other while detecting a parameter of press-in condition and stopping the axial force when the parameter reaches a predetermined value, thereby applying a preload to the bearing apparatus.

The parameter of press-in condition may be a rotation vibration of the bearing apparatus, and the third and fourth raceways are moved closer to each other while detecting the rotation vibration of the bearing apparatus, and stopped when the rotation vibration of the bearing apparatus reaches a predetermined value. The rotation vibration may be produced in a moment direction, a direction perpendicular to the axis, or an axial direction.

The parameter of press-in condition may be a rotation sound of the bearing apparatus, and the third and fourth raceways are moved closer to each other while detecting the rotation sound of the bearing apparatus, and stopped when the rotation sound of the bearing apparatus reaches a predetermined value.

The parameter of press-in condition may be a response to a vibration applied to the bearing apparatus, and the third and fourth raceways are moved closer to each other while detecting the response, and stopped when the response reaches a predetermined value.

The parameter of press-in condition may be a rotation torque of the bearing apparatus, and the third and fourth raceways are moved closer to each other while detecting the torque, and stopped when the torque reaches a predetermined value.

The parameter of press-in condition may be an electric power consumption of the bearing apparatus, and the third and fourth raceways are moved closer to each other while detecting the electric power consumption, and stopped when the electric power consumption reaches a predetermined value.

The parameter of press-in condition may be a pressure on on the third and fourth raceways moved closer to each other, and the third and fourth raceways are moved closer to each other while detecting the pressure, and stopped when the pressure increases to a predetermined value. In this case, it is desirable for smooth operation that a temperature difference is produced between the third and fourth raceways and the second member to reduce or eliminate the interference, and removed after the third and fourth raceways moved closer to each other are stopped.

The parameter of press-in condition may be a capacitance between the radially opposed raceways with the balls therebetween, and the third and fourth raceways are moved closer to each other while detecting the capacitance, and stopped when the capacitance reaches a predetermined value.

The parameter of press-in condition may be an electric resistance between the radially opposed raceways with the balls therebetween, and the third and fourth raceways are moved closer to each other while detecting the electric resistance, and stopped when the electric resistance reaches a predetermined value.

The parameter of press-in condition may be a deformation of at least one of the raceways, and the third and fourth raceways are moved closer to each other while detecting the deformation, and stopped when the deformation reaches a predetermined amount. The deformation may be produced in axial, radial or circumferential directions.

The parameter of press-in condition may be the amount of axial displacement of the second member with reference to the first member when subjected to predetermined bilateral loads relatively applied to the first and second members of the bearing apparatus, and the third and fourth raceways are moved closer to each other while detecting the movement, and stopped when the movement reaches a predetermined amount.

The parameter of press-in condition may be bilateral loads required for predetermined axial displacement of the second member toward the first member of the bearing apparatus, and the third and fourth raceways are moved closer to each other while detecting the load, and stopped when the load reaches a predetermined amount.

The rigidity is also a good parameter for controlling the preload in the bearing unit. Here, the rigidity means the integrity of the assembly of the bearing members such as shaft, raceways and housing etc.

The control method for the bearing apparatus as mentioned above comprises the steps of relatively applying the axial force to the fourth raceway and the second member so as to move the fourth raceway closer to the third raceway while detecting a rigidity of the bearing apparatus and stopping the axial force when the rigidity reaches a predetermined value, thereby applying a preload to the bearing apparatus.

The rigidity may be determined from the relationship with a rotation vibration of the bearing apparatus, and the fourth raceway is moved closer to the third raceway while detecting the rigidity of the bearing apparatus, and stopped when the rigidity of the bearing apparatus reaches a predetermined value.

The rigidity may be determined from the relationship with a rotation sound of the bearing apparatus, and the fourth raceway is moved closer to the third raceway while detecting the rotation sound of the bearing apparatus, and stopped when the rotation sound of the bearing apparatus reaches a predetermined value.

The rigidity may be determined from the relationship with a response to a vibration applied to the bearing apparatus, and the fourth raceway is moved closer to the third raceway while detecting the response, and stopped when the response reaches a predetermined value.

The rigidity may be determined from the relationship with a movement of the second member toward the first member under a predetermined load relatively applied to the first and second members of the bearing apparatus, and the fourth raceway is moved closer to the third raceway while detecting the movement, and stopped when the movement reaches a predetermined amount.

The rigidity may be determined from the relationship with a load required for a predetermined movement of the second member toward the first member of the bearing apparatus, and the fourth raceway is moved closer to the third raceway while detecting the load, and stopped when the load reaches a predetermined amount.

The control method of the preload is also comprises the steps of relatively applying the axial force to the third and fourth raceways so as to move the third and fourth raceways closer to each other while detecting a rigidity of the bearing apparatus, and stopping the axial force when the rigidity reaches a predetermined value, thereby applying a preload to the bearing apparatus.

The rigidity may be determined from the relationship with a rotation vibration of the bearing apparatus, and the third and fourth raceways are moved closer to each other while detecting the rotation vibration of the bearing apparatus, and stopped when the rotation vibration of the bearing apparatus reaches a predetermined value.

The rigidity may be determined from the relationship with a rotation sound of the bearing apparatus, and the third and fourth raceways are moved closer to each other while detecting the rotation sound of the bearing apparatus, and stopped when the rotation sound of the bearing apparatus reaches a predetermined value.

The rigidity may be determined from the relationship with a response to a vibration applied to the bearing apparatus, and the third and fourth raceways are moved closer to each other while detecting the response, and stopped when the response reaches a predetermined value.

The rigidity may be determined from the relationship with a movement of the second member toward the first member under a predetermined load relatively applied to the first and second members of the bearing apparatus, and the third and fourth raceways are moved closer to each other while detecting the movement, and stopped when the movement reaches a predetermined amount.

The rigidity is determined from the relationship with a load required for a predetermined movement of the second member toward the first member of the bearing apparatus, and the third and fourth raceways are moved closer to each other while detecting the load, and stopped when the load reaches a predetermined amount.

The following is another method of preloading a preload-adjustable bearing apparatus as mentioned above.

The method comprises the steps of obtaining an internal clearance of the bearing apparatus and a position of the fourth raceway to determine a movement distance required for preloading, applying an axial force relatively between the fourth raceway and the second member, moving the fourth raceway toward the third raceway by the movement distance required for preloading, thereby applying a preload to the bearing apparatus.

The method also comprises the steps of obtaining an internal clearance of the bearing apparatus and a position of the fourth raceway to determine a movement distance required for preloading, applying an axial force relatively between the third and fourth raceways, moving the third and fourth raceways toward each other by the movement distance required for preloading, thereby applying a preload to the bearing apparatus.

The control method also comprises the steps of applying a first axial force to the second member with reference to the first member in a first direction from the fourth raceway to the third raceway to determine a first state, applying a second axial force to the second member with reference to the first member in a second direction from the third raceway to the fourth raceway to determine a second state, obtaining a movement distance of the second member with reference to the first member from the first state to the second state, calculating a difference in rigidity from the first state to the state where a preset amount of rigidity is obtained, calculating a difference in rigidity from the second state to the state where the preset amount of rigidity is obtained, and moving the fourth raceway by the sum of the movement distance of the second member with reference to the first member and the differences in rigidity from the first and second states to the state where the preset amount of rigidity is obtained.

The following are embodiments of the preload-controlled bearing apparatus according to the present invention.

A preload-controlled bearing apparatus comprises first and second members which are relatively rotatable to each other, and first and second ball rows which are provided radially between the first and second members and have a plurality of balls, respectively, the first member having first and second raceways which are axially juxtaposed and prevent from being closer to each other, the second member having a third raceway which is opposed to the first raceway of the first member with the first ball row therebetween, and a fourth raceway which is axially juxtaposed to the third raceway and opposed to the second raceway of the first member with the second ball row therebetween, the third raceway prevented from being more spaced from the second member, and the fourth raceway flitted onto the second member in a relatively movable interference relationship, such that the fourth raceway axially movable with an axial force relatively applied to the fourth raceway and the second member, and the first member formed with first and second raceways in a single body, the first member formed separately from the third and fourth raceways, each of the raceways formed in an arcuated shape in cross section, specifically in a deep groove type, and the third and fourth raceways pressed closer to each other, wherein the preload is applied to the bearing apparatus.

Another preload-controlled bearing apparatus comprises first and second members which are relatively rotatable to each other, and first and second ball rows which are provided radially between the first and second members and have a plurality of balls, respectively, the first member having first and second raceways which are axially juxtaposed and prevented from being closer to each other, the second member having a third raceway which is opposed to the first raceway of the first member with the first ball row therebetween, and a fourth raceway which is axially juxtaposed to the third raceway and opposed to the second raceway of the first member with the second ball row therebetween, the third and fourth raceways fitted onto the second member in a relatively movable interference relationship, such that the third and fourth raceways are moved toward the each other with an axial force relatively applied to the third and fourth raceways, and the first member formed with first and second raceways in a single body, the first member formed separately from the third and fourth raceways, each of the raceways formed in an arcuated shape in cross section, specifically in a deep groove type, and the third and fourth raceways pressed closer to each other, wherein the preload is applied to the bearing apparatus.

In the method of the present invention, when the preload is applied to the bearing apparatus in a manner that the third raceway is prevented from being more spaced from the second member, and the fourth raceway is fitted onto the second member in a relatively movable interference relationship, such that the fourth raceway is moved toward the third raceway with an axial force relatively applied to the third and fourth raceway and the second member, or in a manner that the third and fourth raceways are fitted onto the second member in a relatively movable interference relationship, such that the third and fourth raceways are moved toward each other with an axial force relatively applied to the third and fourth raceways, the pre-load may be controlled by the steps of relatively applying the axial force to the fourth raceway and the second member so as to move the fourth raceway to the third raceway while detecting a responce to a vibration applied to at least one of the fourth raceway and the second member of the bearing apparatus and stopping the axial force when the response reaches a predetermined value, thereby applying the preload to the bearing apparatus.

The electric signal may be applied to an element which is deformed in an axial direction corresponding to the electric signal.

In addition, both of the fourth raceway and the second member may be vibrated in a manner that when one of the fourth raceway and the second member is contracted, the other is expanded. In this case, the electric signal is applied to an element which is deformed in a direction perpendicular to the axial direction corresponding to the electric signal.

What is claimed is:

1. A preloaded, double row bearing unit comprising:

an outer ring having a first outer raceway and a second outer raceway, a shaft member formed with a first inner raceway, an inner ring formed with a second inner raceway, a first row of rolling members provided between the first outer raceway and the first inner raceway, and a second row of rolling members provided between the second outer raceway and the second inner raceway, wherein the inner ring is tightly fitted to the shaft to produce a friction force due to interference of pressure-fitting between the shaft member and the inner ring, wherein the inner ring has been moved against the friction force by a pushing arm to preload the bearing under a force, wherein the friction force is larger than the force of the preload, and wherein, provided that D is a diameter of a pitch circle defined by the rolling members of the first and second rows and P is a pitch in the axial direction of the outer ring and shaft member in the first row of rolling members and the second row of rolling members, P<D.

2. A preloaded, double row bearing unit comprising:

an outer ring having a first outer raceway and a second outer raceway, a shaft member formed with a first inner raceway, an inner ring formed with a second inner raceway, a first row of balls provided between the first outer raceway and the first inner raceway, and a second row of balls provided between the second outer raceway and the second inner raceway, wherein the inner ring is tightly fitted to the shaft to produce a friction force due to interference of pressure-fitting between the shaft member and the inner ring, wherein the inner ring has been moved against the friction force by a pushing arm to preload the bearing under a force, wherein the friction force is larger than the force of the preload, and wherein, provided that D is a diameter of a pitch circle defined by the balls of the first and second rows and P is a pitch in the axial direction of the outer ring and shaft member in the first row of balls and the second row of balls, P<D.

* * * * *